US 8,964,554 B2

(12) United States Patent
Petry et al.

(10) Patent No.: US 8,964,554 B2
(45) Date of Patent: Feb. 24, 2015

(54) TUNNEL ACCELERATION FOR WIRELESS ACCESS POINTS

(75) Inventors: Brian Petry, San Diego, CA (US); Eric Spada, Groton, MA (US); Stephen Anderson, Raleigh, NC (US); Scott Winterble, Lexington, MA (US)

(73) Assignee: Broadcom Corporation, Irvine, CA (US)

( * ) Notice: Subject to any disclaimer, the term of this patent is extended or adjusted under 35 U.S.C. 154(b) by 41 days.

(21) Appl. No.: 13/490,875

(22) Filed: Jun. 7, 2012

(65) Prior Publication Data

US 2013/0329557 A1 Dec. 12, 2013

(51) Int. Cl.
*H04L 12/24* (2006.01)

(52) U.S. Cl.
CPC .................................. *H04L 12/24* (2013.01)
USPC ........................................................ 370/235

(58) Field of Classification Search
CPC .............. H04L 69/22; H04L 12/40071; H04L 12/4633; H04L 29/0653
See application file for complete search history.

(56) References Cited

U.S. PATENT DOCUMENTS

| | | | | |
|---|---|---|---|---|
| 6,463,477 | B1* | 10/2002 | Fontenot | 709/236 |
| 7,864,764 | B1* | 1/2011 | Ma et al. | 370/389 |
| 8,311,726 | B2 | 11/2012 | Patel et al. | |
| 2003/0196081 | A1 | 10/2003 | Savarda et al. | |
| 2005/0007958 | A1* | 1/2005 | Auerbach | 370/241 |
| 2005/0086325 | A1* | 4/2005 | Slipp et al. | 709/219 |
| 2007/0250627 | A1* | 10/2007 | May et al. | 709/225 |
| 2010/0186087 | A1* | 7/2010 | Bolton et al. | 726/22 |

FOREIGN PATENT DOCUMENTS

WO WO 01/05087 A2 1/2001

OTHER PUBLICATIONS

P. Calhoun, Control and Provisioning of Wireless Access Points (CAPWAP) Protocol Specification, IETF Trust, http://tools.ietf.org/html/rfc5415#section-4.2.*
S. Kent, IP Authenitcation Header, 1998, The Internet Society, Version 6, http://tools.ietf.org/html/draft-ietf-ipsec-auth-header-06.*
European Search Report, App. No. 13002843.4, Oct. 28, 2013, 3 pages.

* cited by examiner

*Primary Examiner* — Huy D Vu
*Assistant Examiner* — Bao G Nguyen
(74) *Attorney, Agent, or Firm* — Brinks Gilson & Lione

(57) ABSTRACT

A method and system for network offloading includes receiving a packet at a communication interface of a wireless access point and processing the packet at a flow acceleration processor prior to processing the packet at a host processor. The flow acceleration processor may process the packet for header checking or security processing. The flow acceleration processor may provide the packet to a security coprocessor for security processing. The flow acceleration processor may generate a result code indicating whether the processing at the flow acceleration processor was successful. If the processing was unsuccessful, the packet is provided to the host processor for exception processing.

20 Claims, 11 Drawing Sheets

TUNNEL ACCELERATION FOR WIRELESS ACCESS POINTS

TECHNICAL FIELD

This disclosure relates to offloading certain packet processing from a host processor to other processing resources. In particular, this disclosure relates to in-line tunnel acceleration, which may offload protocol operations and security algorithms from a host processor in order to reduce the load on the host processor and improve processing latency and throughput in a Control and Provisioning of Wireless Access Points (CAPWAP).

BACKGROUND

Rapid advances in electronics and communication technologies, driven by immense customer demand, have resulted in the widespread adoption of wireless access points. Wireless access points, or enterprise access points (EAPs), provide wireless connections for transferring data to and receiving data from wirelessly connected equipment. Wireless access points may also provide wired connections for transferring data to and receiving data from wired networked equipment. As packets move through the wireless access point, the wireless access point processes the packet. When processing a packet, wireless access points may conform to various protocols and standards, such as Control and Provisioning of Wireless Access Points (CAPWAP), Generic Routing Encapsulation (GRE), Network Address and Port Translation (NAPT), Internet Protocol Security (IPsec). Further improvements in handling such protocols and standards will continue to make wireless access points and other networking devices attractive options for the consumer.

BRIEF DESCRIPTION OF THE DRAWINGS

The innovation may be better understood with reference to the following drawings and description. In the figures, like reference numerals designate corresponding parts throughout the different views.

DETAILED DESCRIPTION

Figure 1:
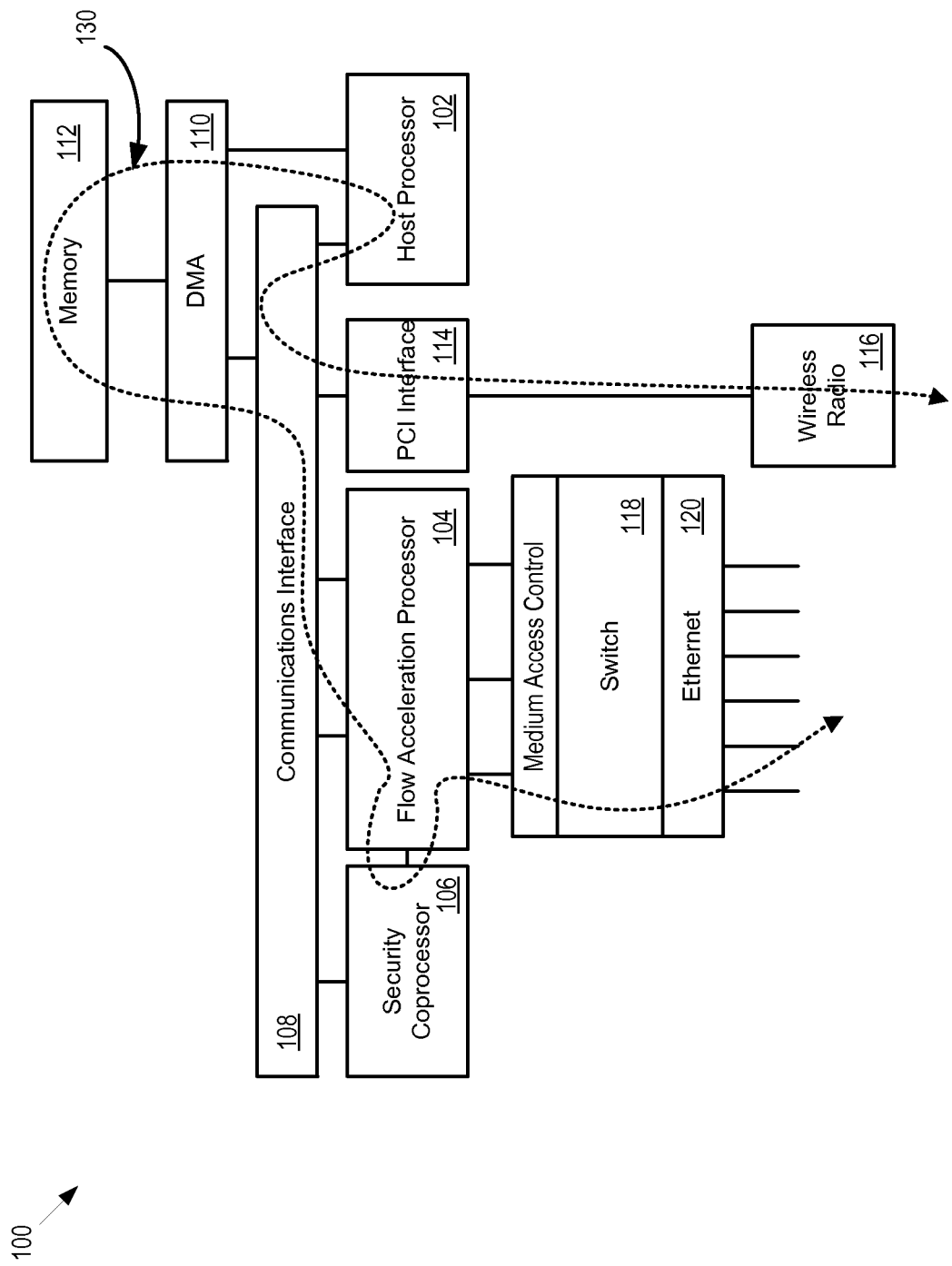
FIG. 1 shows an example of system that uses a flow acceleration processor to move packets through a wireless access point.

The discussion below makes reference to flows. A flow may be considered a sequence of packets in a network that share certain state information. A flow may be received or transmitted by a wireless access point, and the packets within the flow may be processed at the wireless access point. When the wireless access point processes a packet, the processing may include protocol operations and security algorithms specified by a networking standard, processing may include, as examples security algorithm processing, context switching, packet fragmentation handling, protocol header insertion, header checks, sequence number insertion and validation, and interrupt processing. For example, the processing may be associated with processing defined by Control and Provisioning of Wireless Access Points (CAPWAP), Generic Routing Encapsulation (GRE), Network Address and Port Translation (NAPT), Internet Protocol Security (IPsec), or other protocols. The wireless access point may be used in a wireless local area network (WLAN) and may be compliant with 802.11. In other implementations, the wireless access point may be configured to be used in other wireless data systems, such as GSM, 3G, WCDMA, 4G, WiMAX, CDMA, and CDMA2000, and may be configured for use with any combination of wireless data systems.

Packet processing for a flow at a wireless access point may be performed by a host processor, such as a CPU, or may be offloaded to a dedicated processor, such as an ASIC, that can process the packet. In one implementation, the host processor may perform a portion of the packet processing and the dedicated processor may perform a portion of the packet processing. A wireless access point may receive packets, transmit packets, or both, and packet processing may occur when the wireless access point receives the packet, before the wireless access point transmits the packet, or both. The type of packet processing that is performed may depend on the packet type. Packet processing may include, among other examples, verifying the packet, identifying a header portion and a payload portion of a packet, decrypting an encrypted portion of a packet, fragmenting the packet into smaller packets, or determining the packet's membership, if any, in a flow. Packet processing is not limited to these examples, and other packet processing may be performed on the packet.

When a host processor processes packets, the host processor may use software to processes the packets. Using software on the host processor to process the packets may consume significant resources of the host processor. If the data transfer rate of the packet flow is high, the host processor may have insufficient processing capability to process the packets quickly. If the host processor is unable to processes the packets with a speed sufficient to match the data transfer rate, packet latency may occur and the host processor may unnecessarily slow down the rate at which packets may move through the wireless access point.

In order to process packets more quickly and reduce the load on the host processor, the host processor may offload packet processing to a flow acceleration processor. The flow acceleration processor may handle some, or all, of the packet processing to alleviate the load on the host processor. In such a manner, the wireless access point may be able to process packets at a high data transfer rate without packet latency.

A wireless access point may include certain data paths for packets as the packets move through various components of the wireless access point. Data paths may include a receive path, a transmit path, and a control path, and various types of processing may be performed on the packet, depending on the path the packet takes. FIG. 1 shows an example of the components and data path in wireless access point 100. Host processor 102 may contain software for processing packets and may be connected to a flow acceleration processor 104 through a communications interface 108. Flow acceleration processor (FAP) 104 may be a dedicated processor for processing packets. Security coprocessor 106 may communicate directly with the FAP 104 and may communicate with the host processor 102 through communications interface 108. Data path 130 shows an example of a packet's path through the wireless access point 100.

As an example of a receive path, the wireless access point may receive a packet on the Ethernet port 120. Switch 118 may relay the received packet to the FAP 104 for receive packet processing. As part of the receive packet processing, the FAP 104 may pass the packet to a security coprocessor 106 for security processing on the packet or a portion of the packet. Once security processing is complete, the security coprocessor 106 may return the packet to the FAP 104 for further receive packet processing. When the FAP 104 completes its processing on the packet, the FAP 104 may store the packet in memory 112 via the communications interface 108 and memory controller 110, where the host processor 102 may access the packet through the memory controller 110 to perform additional receive packet processing or exception handling. The communications interface may be an internal parallel bus or switch fabric interface, including for example, an advanced extensible interface (AXI). The memory 112 may be a DRAM, which may be external or internal to the FAP 104. As one example, memory 112 may be a double data rate (DDR) memory, and the memory controller 110 may be a direct memory access (DMA) memory controller. In other implementations, the wireless access point may use other types of communications interfaces, memory, or memory controllers.

As an example of a transmit path, the host processor 102 may place, through the memory controller 110, a packet into memory 112 for transmitting. In some instances, the host processor 102 may perform transmit processing before placing the packet into memory 112 for the FAP 104 to perform additional transmit processing. The transmit processing may include applying header information, packet fragmentation, or security processing. After the FAP 104 performs transmit processing, the packet may be relayed to the switch 118 for wired transmission through the Ethernet port 120. Alternatively, the packet may be relayed to the memory 112 for wirelessly transmitting the packet using wireless radio 116.

As one example, wireless radio 116 may be a 802.11 controller chip such as chip number BCM43460, available from Broadcom Corporation of Irvine Calif.

Figure 2:
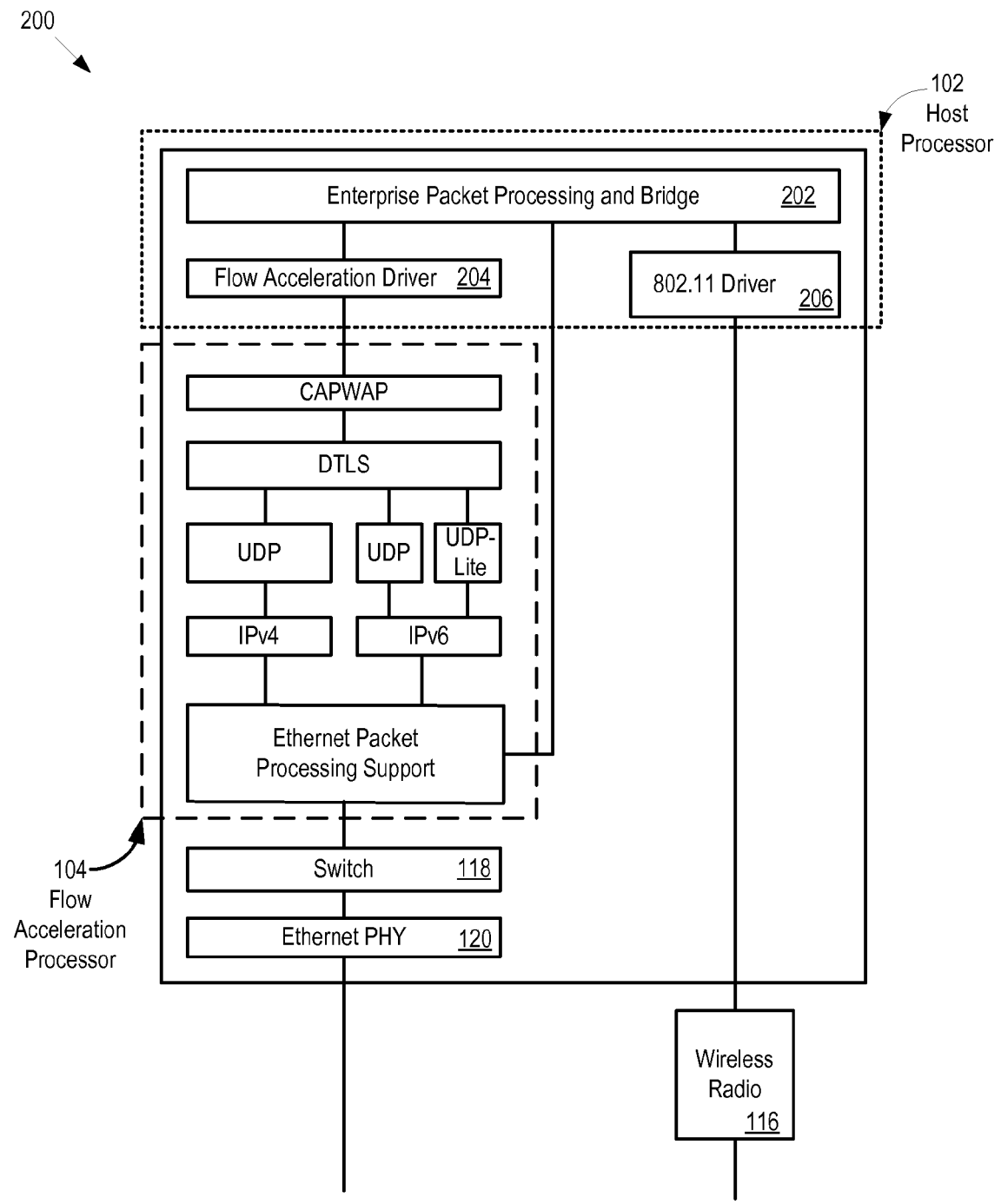
FIG. 2 is an example of a protocol stack used in a wireless access point.

FIG. 2 shows the protocol stack that the FAP 104 may use at the wireless access point 200. For example, the host processor 102 may use an enterprise packet processing bridge 202 to direct packets through the wireless access point 200. The enterprise packet processing bridge 202 may use a flow acceleration driver 204 to communicate with the flow acceleration processor 104 and an 802.11 driver 206 for communicating with the wireless radio 116. Within the FAP 104, various protocols may be processed as part of a protocol stack, including for example, protocols that use CAPWAP, DTLS, UDP, UDP-Lite, IPv4, IPv6, and Ethernet Packet Processing. The various packet types associated with the protocol stack are described in further detail below.

Packet Encapsulation Format

The FAP 104 may process a variety of types of packets. Each type of packet may have a packet encapsulation format that includes header fields, data fields, and trailer fields. If the FAP 104 recognizes the packet encapsulation format, the FAP 104 may process the packet. If the FAP 104 does not recognize the packet encapsulation format, the FAP 104 may provide the packet to the host processor 102 for exception processing. For example, FIGS. 3-9 show exemplary packet encapsulation formats that the FAP 104 may recognize. When the packet encapsulation format is one that the FAP 104 recognizes, a recognition criteria may be met, and the FAP 104 may continue processing the packet. If the FAP 104 determines that the packet encapsulation format is one that the FAP 104 does not recognize, the recognition criteria may not be met, and the FAP 104 may provide the packet to the host processor 102 for exception processing.

Each packet encapsulation format may include a series of fields. The field type may be a header field, data field (payload or message), or trailer field. Each field may include a number of subfields. In addition, each subfield may include a number of data bits that are used to store specific information corresponding to the subfield. The information may be used, as examples, for routing information, security information, or payload data. The various fields may be authenticated or encrypted. Table 1 lists examples of the various fields and subfields that may be included in a packet encapsulation format.

TABLE 1

| | | | | |
|---|---|---|---|---|
| Field | Field Type | Subfield | Size (bits) | Description |
| Custom Header | Header | (none) | 32 or 64 | Reserved for use by the software for controlling aspects of the access point hardware. |
| | | DTLS offset | 14 | Reserved for use by the software to direct (re)processing of a received packet and locate the first DTLS record to be processed. Offset in bytes, from first byte of user datagram protocol (UDP or UDP-Lite) payload, of the first DTLS record to be processed. |
| Ethernet | Header | DMAC | 48 | Destination Medium Access Layer Address |
| | | SMAC | 48 | Source Medium Access Layer Address |

Header Types

TABLE 1-continued

Header Types

| Field | Field Type | Subfield | Size (bits) | Description |
|---|---|---|---|---|
| | | Outer 8021q.TPID = 0x9100 | 16 | 0x9100 signals presence of optional "outer tag" of the tag and priority identifier (TPID). Used for Metro Ethernet and other switching applications. |
| | | Outer 8021q.PCP,VID | 16 | Outer tag: Priority Code Point (PCP), Virtual Local Area Network (VLAN) Identifier |
| | | Inner 8021q.TPID = 0x8100 | 16 | 0x8100 signals presence of "inner tag." |
| | | Inner 8021q.PCP,VID | 16 | Inner tag, Priority Code Point, VLAN Identifier |
| | | LLC and SNAP | 48 | Optional field for logical link control (LLC) and sub-network access protocol (SNAP) |
| | | EtherType | 16 | EtherType signals the protocol type of the next header. For example, valid codes are IPv4 (0x800) or IPv6 (0x86DD) |
| IPv4 | Header | Version | 4 | Indicates the Internet Protocol (IP) packet version. Here, version 4. |
| | | Header Length | 4 | Length of header in 4-byte words. 5 to 15 words |
| | | DSCP | 8 | Differentiate Services Code Point |
| | | ECN | 2 | Explicit Congestion Notification |
| | | Total Length | 16 | Overall datagram length |
| | | ID | 16 | Packet ID |
| | | Flags | 8 | Indicating whether or not to fragment (don't fragment) and how much to fragment (more fragment) |
| | | Fragment Offset | 13 | Fragment offset in 8-byte blocks |
| | | TTL | 8 | Time-to-Live |
| | | Protocol | 8 | Identifies next protocol. For example, UDP (17). Part of flow key. |
| | | Header Checksum | 16 | Checksum of the header |
| | | Source Address | 32 | Address of the source |
| | | Destination Address | 32 | Address of the destination |
| | | Options | 0 to 320 | IPv4 options. |
| IPv6 | Header | Version | 4 | Indicates the IP packet version. Here, version 6. |
| | | Traffic Class | 8 | DSCP and ECN. |
| | | Flow Label | 20 | Label for the flow. |
| | | Payload Length | 16 | Payload size in bytes; includes option headers. |
| | | Next Header | 8 | Identifies next header (upper protocol or IPv6 options). For example, valid codes may be UDP-Lite (136) or UDP (17). |
| | | Hop Limit | 8 | Limit to the number of hops. |
| | | Source Address | 128 | Address of the packet's source. |
| | | Destination Address | 128 | Address of the packet's destination. |
| | | Extension Headers | 0-N | Variable number of extension headers from 0 bits to N bits. |
| UDP | Header | Source Port | 16 | Port on which the access point receives packets. For example, port 5246 for control packets and 5247 for data packets. |
| | | Destination Port | 16 | Port at which the access point transmit packets. For example, port 5246 for control and 5247 for data. |
| | | Length | 16 | Length of the packet. |
| | | Checksum | 16 | Always 0 (no checksum). |

TABLE 1-continued

Header Types

| Field | Field Type | Subfield | Size (bits) | Description |
|---|---|---|---|---|
| UDP-Lite | Header | Source Port | 16 | Port on which the access point receives packets. For example, port 5246 for control packets and 5247 for data packets. |
| | | Destination Port | 16 | Port at which the access point transmit packets. For example, port 5246 for control and 5247 for data. |
| | | Checksum Coverage | 16 | Number of bytes, including UDP-Lite header, that are covered. Should be 8. |
| | | Checksum | 16 | The UDP checksum covers a pseudo-header, an assembly of collected fields from the IP header. |
| CAPWAP DTLS Header | Header | Version | 4 | Version. Configurable. Expected to be zero. Note: CAPWAP DTLS Header is not present for cleartext CAPWAP messages. |
| | | Type | 4 | Indicates CAPWAP DTLS header. Value = 1 |
| | | Reserved | 24 | Taken from software on transmit. 0 on receive. |
| DTLS Record Header | Header | Content Type | 8 | Identifies the record type. Defined the same as TLS. On receive, FAP recognizes change_cipher_spec(20) and application_data(23). |
| | | Version | 16 | 0xfeff. For RFC4347 DTLS. |
| | | Epoch | 16 | Identifies security context. Verified on receive. |
| | | Sequence Number | 48 | Set to 0 for each new epoch. |
| | | Length | 16 | Record length (in one packet, not fragmented). Does not include DTLS record header. |
| CAPWAP Header | Header | Version | 4 | CAPWAP Version. Configurable Note: On receive, CAPWAP header may be interpreted by host processor. On transmit, flow acceleration processor may generate headers for CAPWAP fragmentation. |
| | | Type | 4 | Should be 0 |
| | | HLEN | 5 | Header length, including optional headers. |
| | | RID | 5 | Radio ID number. |
| | | WBID | 5 | Wireless binding identifier. Identifies format of optional wireless header |
| | | T | 1 | Type |
| | | F | 1 | Fragment. (Set to 1 if packet is a fragment) |
| | | L | 1 | Last. (Set to 1 if packet is last fragment) |
| | | W | 1 | Wireless. (Set to 1 if optional wireless header present) |
| | | M | 1 | Radio Medium Access Layer. (Set to 1 if radio Medium Access Layer optional header present) |
| | | K | 1 | Keep-alive. (Set to 1 if packet is a keep-alive and contains no data) |
| | | Flags | 3 | Reserved. Should be 0 |
| | | Fragment ID | 16 | Identifier for the fragment the of the packet. |
| | | Fragment Offset | 13 | Byte offset in CAPWAP payload for the data |

TABLE 1-continued

Header Types

| Field | Field Type | Subfield | Size (bits) | Description |
|---|---|---|---|---|
| | | Reserved | 3 | |
| | | Radio Medium Access Layer Address (optional) | 8 + 48 or 8 + 64 | Used for the case CAPWAP 802.3 encapsulation stripped the access point's 802.11 Medium Access Layer address |
| | | Wireless Specific Info (optional) | 32 | Variable length. Format depends on the WBID. For 802.11, it is defined by RFC5416. |
| Payload | Data | Application data | Var | Variable length. Wireless data payload. |
| Message | Data | Control Message | Var | Variable length. Control instructions for processing. This may be upper protocol messages or other message elements. |
| MAC | Trailer | MAC | Var | Varies depending on Message Authentication Code (MAC) algorithm and the type of secure hash algorithm (SHA). Null: 0, SHA-1: 160, SHA-2: 256 |
| Cyclic Block Cipher (CBC) pad | Trailer | CBC block padding | Var | Fill bytes to round out the last cryptographic block in a DTLS-encapsulated payload. Each fill byte has the same value as CBC pad length |
| CBC pad length | Trailer | Number of bytes of padding present | 8 | Indicates size of CBC pad field. 0 to 255 bytes |

Figure 3:
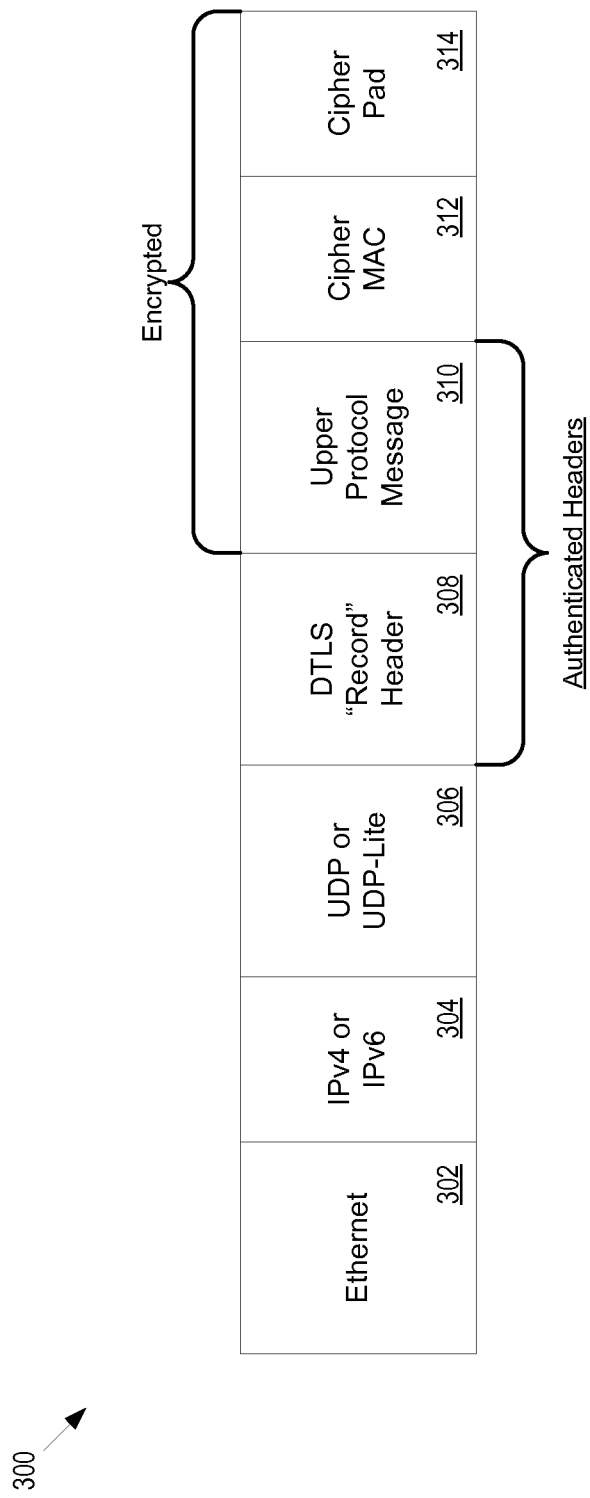
FIG. 3 is an example of a packet encapsulation format for a secured data transport layer (DTLS)-alone packet (no CAPWAP).
Figure 4:
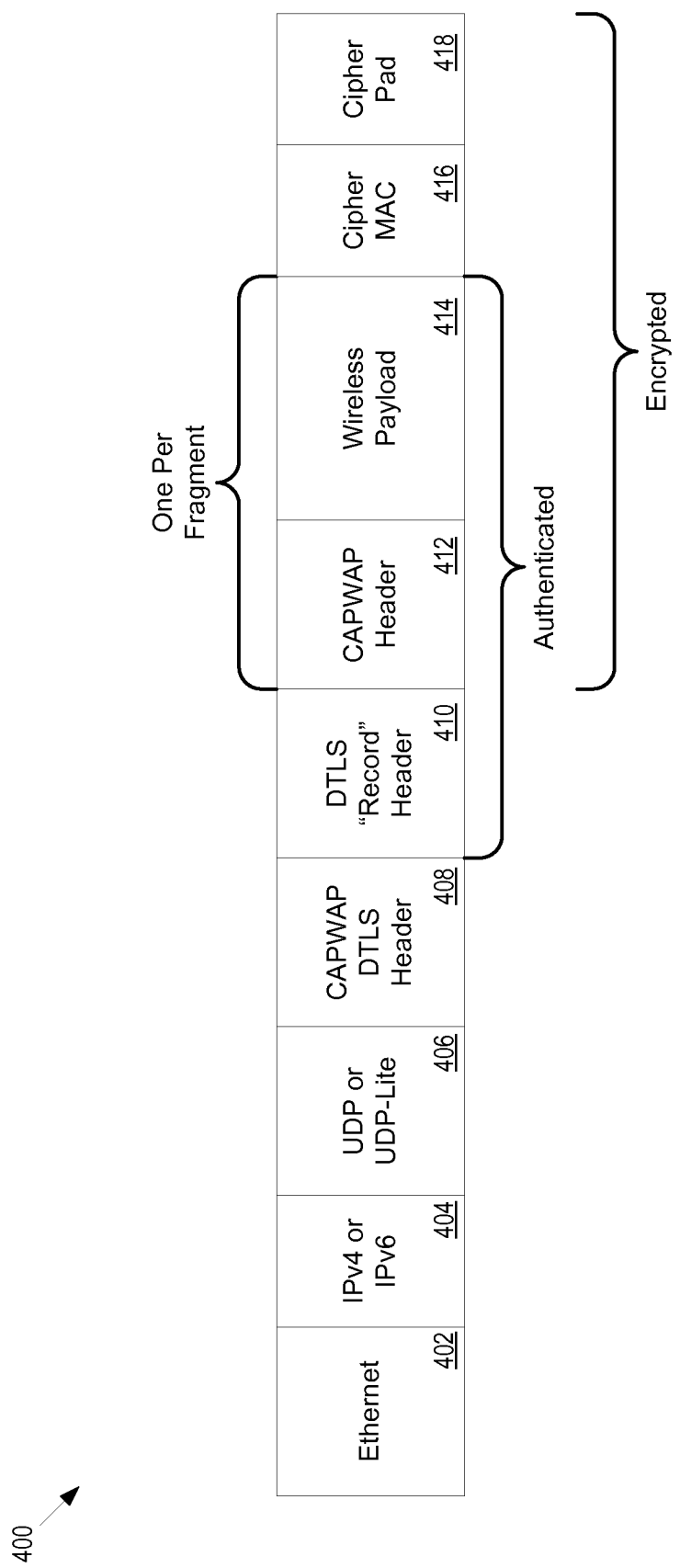
FIG. 4 is an example of a packet encapsulation format for a secured CAPWAP data packet.
Figure 5:
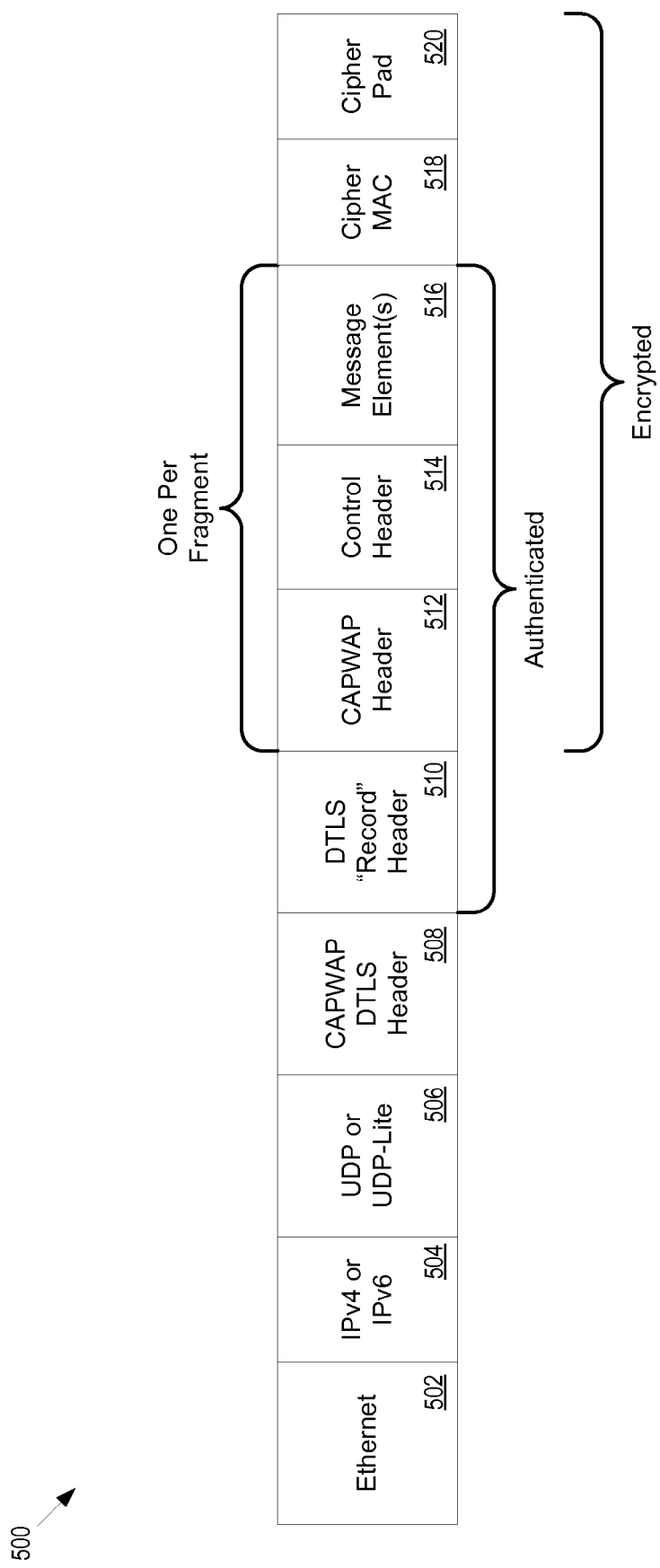
FIG. 5 is an example of a packet encapsulation format for a secured CAPWAP control packet.
Figure 6:
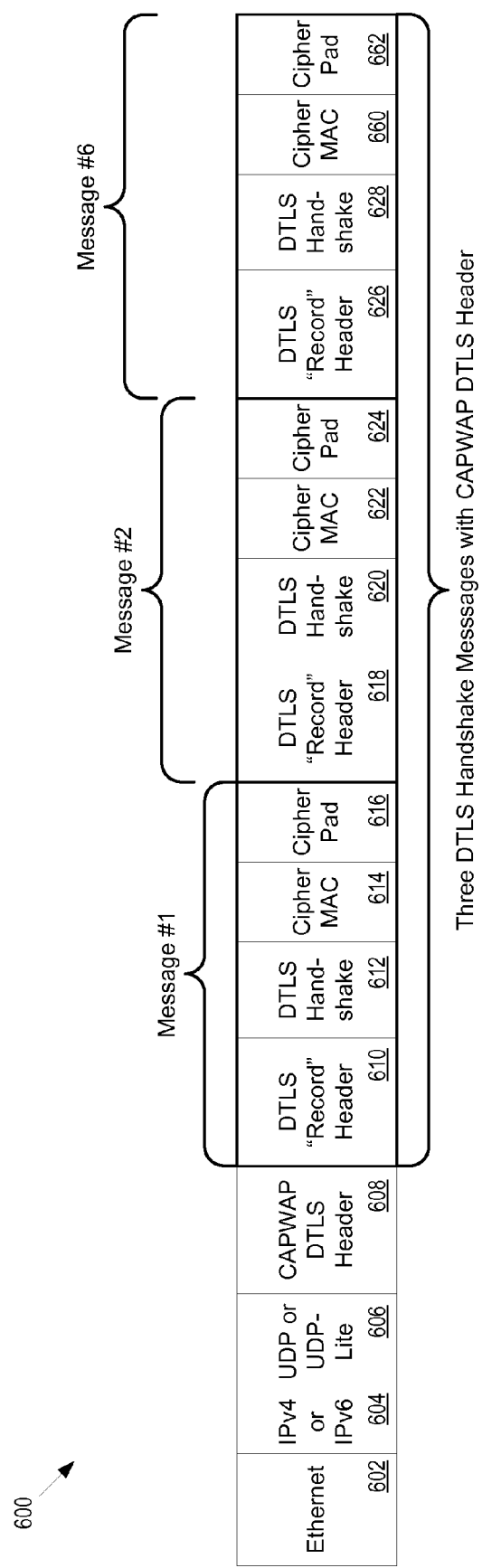
FIG. 6 is an example of a packet encapsulation format for a secured multi-DTLS handshake packet with CAPWAP DTLS header.
Figure 7:
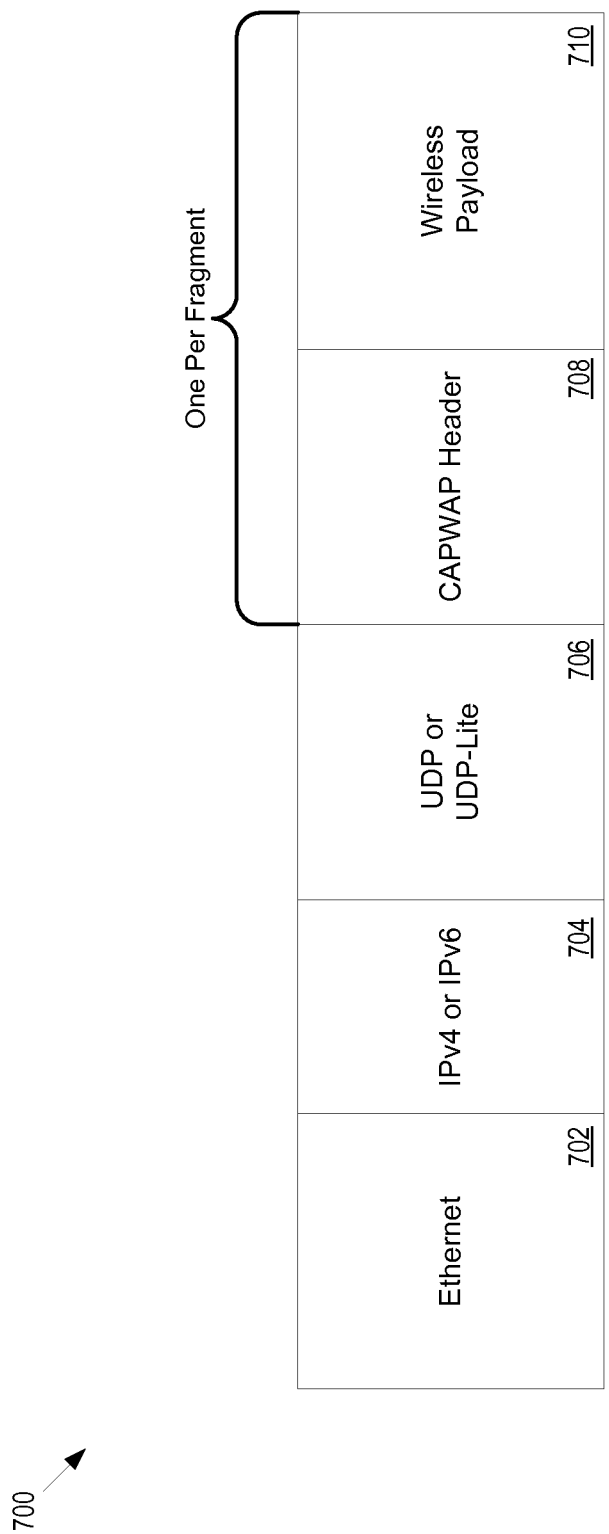
FIG. 7 is an example of a packet encapsulation format for a plain text CAPWAP data packet.
Figure 8:
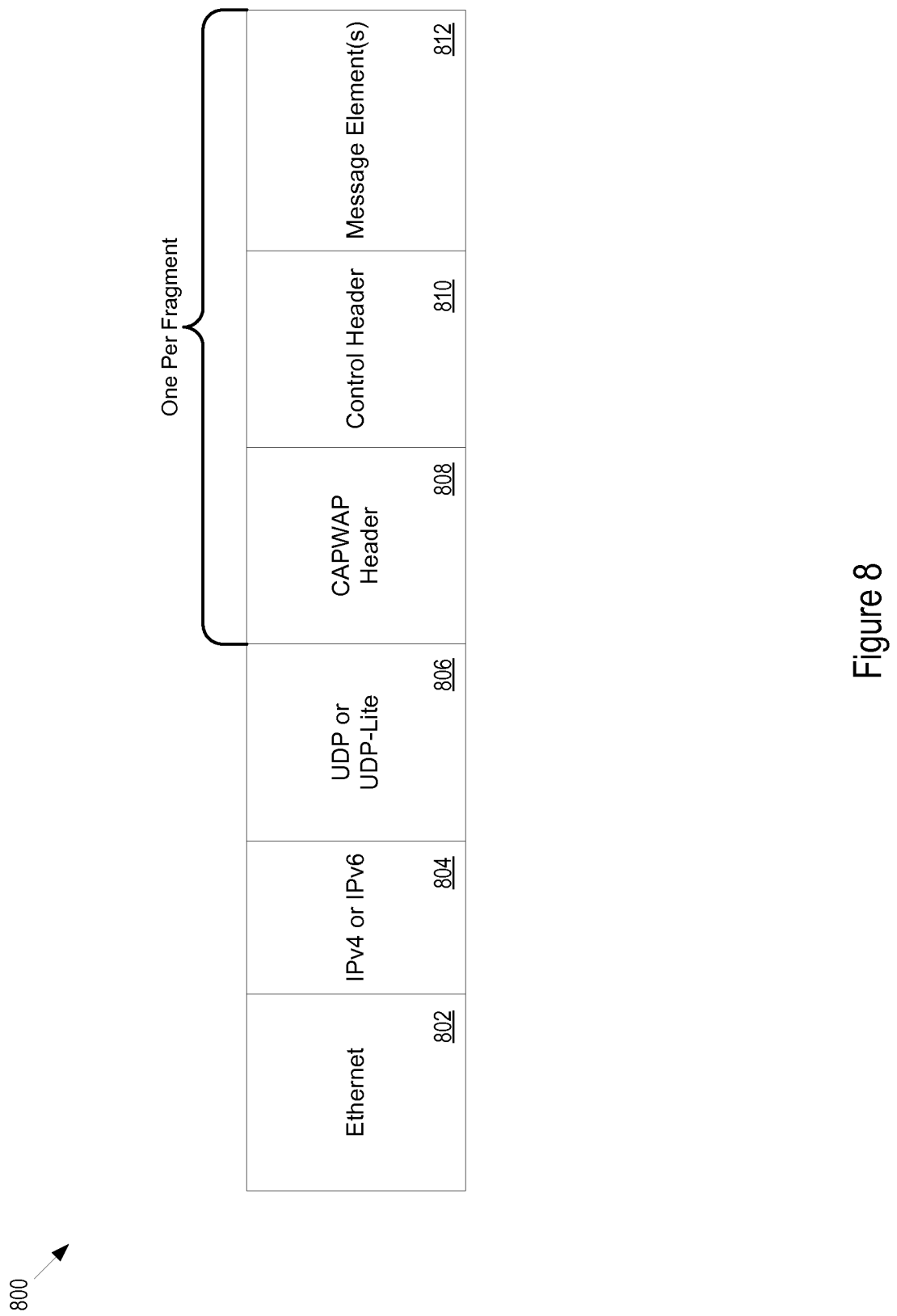
FIG. 8 is an example of a packet encapsulation format for a plain text CAPWAP control packet.

FIG. 3 shows an example of a data packet 300 including various subfields as described in Table 1. The packet encapsulation format of data packet 300 may be the packet encapsulation format for a Transport Layer Security (DTLS)-Alone packet (no CAPWAP). In this example, included in data packet 300 is Ethernet header field 302, IPv4 or IPv6 field 304, user datagram protocol (UDP) or UDP-Lite header field 306, DTLS record header field 308, upper protocol message field 310, cipher Message Authentication Code (MAC) trailer field 312, and cipher pad trailer field 314. If data packet 300 is received by the FAP 104 for processing and if FAP 104 recognizes the packet encapsulation format, the FAP 104 may parse and process the fields and subfields. In some implementations, the FAP 104 may process a series of fields that include the first 128 bytes of data of a packet encapsulation. In addition, DTLS record header type 308 and upper protocol message type 310 may be field types that the FAP 104 may process for authentication using the security coprocessor 106. In addition, cipher MAC header type 312 and cipher pad header type 314 may be header types that the FAP 104 may process for encryption/decryption using the security coprocessor 106.

FIGS. 4-9 show additional examples of packet encapsulation formats that may include the various field types listed in Table 1. The combination and order of fields and subfields may vary from those shown and may depend on the type of packet. In addition, additional fields, such as a custom header field, may be prepended to the packet encapsulation formats listed in FIGS. 3-9. The FAP 104 could preprocess the custom header field before processing the packet and remove the custom header before performing further processing.

Flow Descriptors

In order to identify a flow with which a packet is associated, the FAP 104 may use a flow key for identifying a flow. The flow key may be a set of fields extracted from a packet header. The flow key may uniquely identify a CAPWAP tunnel endpoint. In one example, the flow key may be 108 bits and include the following fields: flow key type (3 bits), IP type (1 bit), IPv4 (72 bits), UDP source port (16 bits), UDP destination port (16 bits). In another example, the flow key may be 300 bits and include the following fields: flow key type (3 bits), IP type (1 bit), IPv6 (264 bits), UDP source port (16 bits), UDP destination port (16 bits). In other implementations, the flow key may include other fields and bit lengths.

The FAP 104 may use the flow key to refer to a protocol context for the flow. The protocol context may indicate the type of processing that may be used for the packet. The protocol context may include a protocol context for the data and a protocol for the control. The protocol context may be grouped into a record as a flow descriptor. A flow key may be used as a record identified to look up the flow descriptor associated with a given flow key. As one example of a flow descriptor, the flow descriptor may be 149 bytes and may include the fields listed below in Table 2. In other implementations, the flow descriptor may include other fields and bit lengths.

TABLE 2

Flow Descriptor Fields

| Field | Bytes | Description |
|---|---|---|
| Protocol Encapsulation Format | 1 | CAPWAP DTLS Header Present (1 bit). The receive processing assumes a CAPWAP DTLS header appears first in the UDP payload and precedes a DTLS record header, which is also present DTLS Alone (1 bit). The receive processing assumes a DTLS header appears first in the UDP payload (no CAPWAP DTLS Header Present) Plaintext without DTLS (1 bit). The receive |

TABLE 2-continued

Flow Descriptor Fields

| Field | Bytes | Description |
|---|---|---|
| | | processing ignores all headers in the UDP payload Reserved (5 bits) |
| Cipher Spec | 81 | A subset of the flow descriptor that describes the security context: Block encryption algorithm. 3 bits. Selects from 1 of 7 entries in a configuration table (see Table 5). Note: Encryption block size is not stored in the flow descriptor. The block encryption also specifies the block size. MAC hash algorithm. 3 bits. Selects from 1 of 7 entries in a configuration table (see Table 5). Note: MAC hash size is not stored in the flow descriptor. The MAC hash algorithm also specifies the hash size. DTLS epoch. 16 bits. The epoch identifies the cipher context for the data flow. When processing a packet, the flow acceleration processor may verify that the epoch identified in a DTLS record matches the epoch in the flow descriptor. DTLS highest valid sequence number. 48 bits. The highest sequence number yet received, and validated by the DTLS MAC. DTLS sequence window. 64 bits. A bitmask used to track the last 64 valid sequence numbers and validate a received sequence number. MAC secret. 256 bits. Used to verify the MAC of a DTLS record. Encryption key. 256. Used to decrypt a DTLS record. The host processor may generate the encryption key. Alternatively, the security coprocessor may generate the encryption key. Note this is the key assigned by the transmitting entity, not the receiving entity. |
| Pending Cipher Spec | 67 | The pending cipher spec has the same format as the cipher spec listed above. When the FAP encounters a DTLS command indicating that the cipher spec should change, the FAP may update the cipher spec with the value from pending cipher spec. The host processor may then update the pending cipher spec with the cipher spec to use in the event the FAP encounters a DTLS command indicating that the cipher spec should change. |

Receive Processing Path

Figure 9:
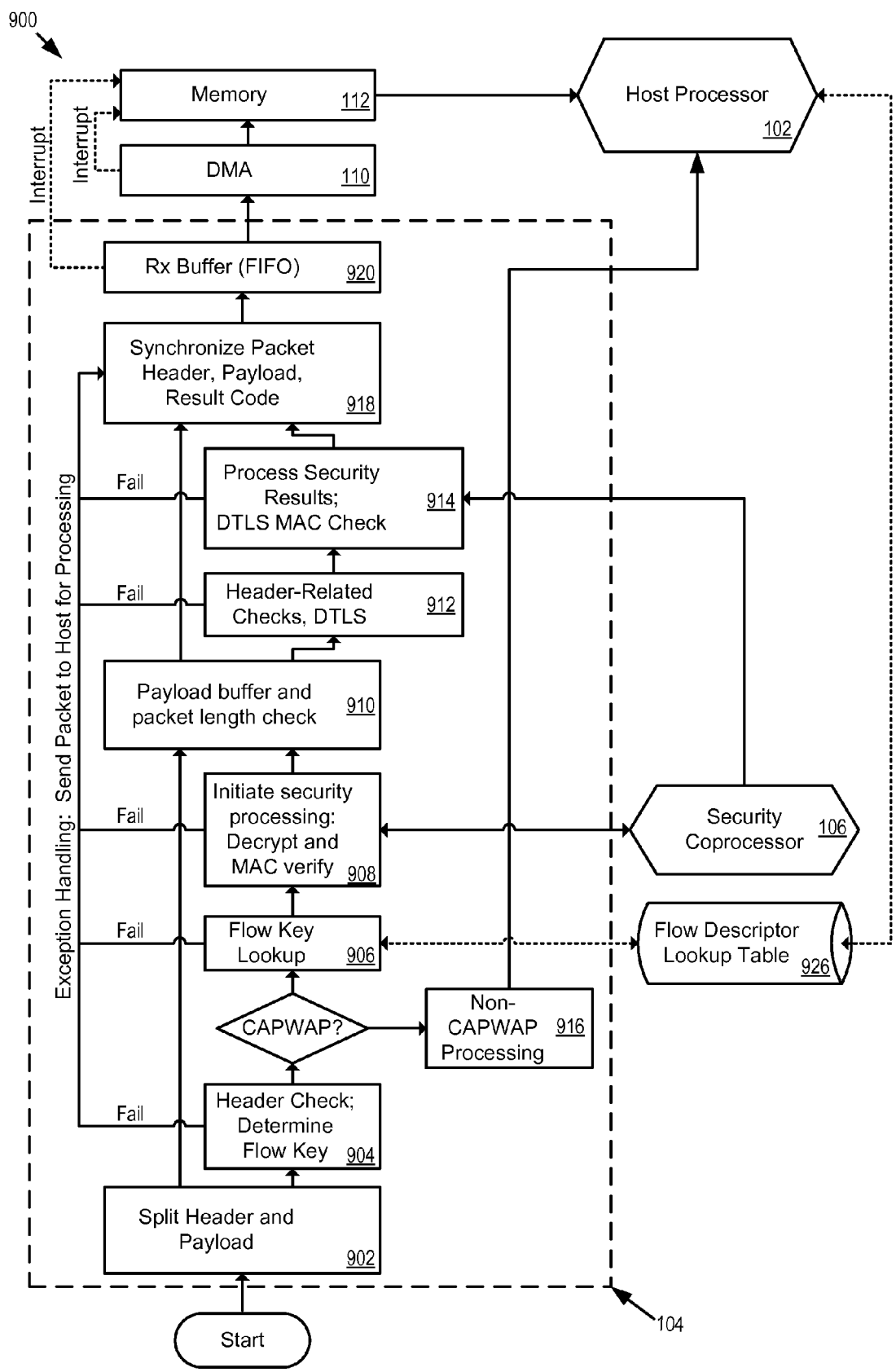
FIG. 9 is an example of a flow diagram for receive processing that uses a flow acceleration processor.

As described above, the wireless access point may receive packets for processing. When the wireless access point receives a packet, the FAP 104 may perform processing on the packet. FIG. 9 shows an example flow diagram 900 of processing stages that the FAP 104 may use when processing a packet. When the FAP 104 receives a packet, the FAP 104 may determine the header portion of the packet and the payload portion of the packet (902). The FAP 104 then checks the packet header to extract the flow key and determine if the packet has a packet encapsulation format that the FAP 104 recognizes (904). If the FAP 104 does not recognize the packet header, the FAP 104 may generate a result code indicating that the header is not recognized and then send the packet to the host processor 102 for further processing (918). If the FAP 104 recognizes the header format, then the FAP 104 may continue to process the packet by determining if the header format indicates a CAPWAP packet type. If the packet type is non-CAPWAP, then the FAP 104 may use non-CAPWAP processing to process the packet (916). If the packet type is CAPWAP, then the FAP 104 may look up the packet's flow key in the flow descriptor lookup table 926 to obtain the flow descriptor associated with the packet's flow key (906). As described above, the flow descriptor provides the protocol context that the FAP 104 may use for processing the packet.

Further, the host processor 102 may update the values stored in the flow descriptor lookup table 926.

If the flow key lookup is unsuccessful or if the FAP 104 does not recognize the flow descriptor, the FAP 104 may generate a result code indicating that the flow key lookup is unsuccessful or the flow descriptor is not recognized and send the packet to the host processor 102 for further processing (918). If the flow key lookup is successful or if the FAP 104 recognizes the flow descriptor, then the FAP 104 may continue to process the packet by initiating security processing (908). In order to perform security processing, the FAP 104 may deliver the packet to the security coprocessor 106 for security processing. The security processing may include decrypting the payload portion of the packet, calculating message authentication code (MAC) hash, or both. If the security processing is unsuccessful, the FAP 104 may generate a result code indicating that the security processing was unsuccessful and send the packet to the host processor 102 for further processing (918).

If the security processing is successful, then the FAP 104 may continue to process the packet by checking the payload buffer and packet length (910). Next, the FAP 104 may continue to perform header-related checks and DTLS processing (912). If the header-related checks and DTLS processing are unsuccessful, the FAP 104 may generate a result code indicating that the header-related checks and DTLS processing were unsuccessful and send the packet to the host processor 102 for further processing (918). If the header-related checks and DTLS processing are successful, and if the security coprocessor 106 has not performed the header-related checks and DTLS processing as part of the security processing in the security coprocessor 106, then the FAP 104 may continue to process the packet by processing the security results and performing a DTLS MAC check (914). If the security results and DTLS MAC check are unsuccessful, the FAP 104 may generate a result code indicating that the security results and DTLS MAC check were unsuccessful and send the packet to the host processor 102 for further processing (918).

In block 918, the FAP 104 reassembles the packet header, packet payload, and result code and places the reassembled packet into the receive buffer 920, for delivery to the memory 112. The receive buffer 920 may be, for example, a FIFO buffer. Once the reassembled packet is in memory 112, the host processor 102 may obtain the reassembled packet for further receive processing. If the FAP 104 generated a result code indicating that a certain processing step was unsuccessful, the host processor 102 may perform exception processing on the packet.

Flow diagram 900 may be implemented, as one example, using the following algorithm. In other implementations, header offsets, bit lengths, skipped headers, supported header types, and processing sequences may differ from those listed below.

I. Protocol Context Independent ("Stateless") Processing
  a. Validate Custom header. 32- and 64-bit format, depending on opcode
     i. If opcode is for CAPWAP, extract 14-bit DTLS header offset
  b. If Ethernet destination address is unexpected then halt processing. Packet and result descriptor is not delivered to software. Note: CAPWAP processing is halted, but the FAP may need to forward the packet for bridge processing and forwarding to another node
  c. Skip over 802.1q header(s) if present. Note that FAP may ignore priority and Virtual Local Area Network (VLAN) tags d. Skip over LLC/SNAP header if present. Ignore LLC length.
e. If EtherType is not IPv4 (0x800) or IPv6 (0x86DD) then send to the host processor for software processing.
f. If IPv4
  i. Calculate header checksum according to RFC1071. If checksum does match packet then send to the host processor for software processing
  ii. If IP version number field !=4 then send to the host processor for software processing
  iii. If IP more fragments bit==1 or fragment offset >0 then send to the host processor for software processing
  iv. If IP protocol !=UDP (17) then send to the host processor for software processing
  v. If IP header length !=5 (5 32 bit words) then send to the host processor for software processing. (Less than 5 indicates an error and more than 5 indicates IP options are present)
  vi. If UDP checksum !=0 then send to the host processor for software processing
  vii. Initialize IPv4 flow key with protocol, source address, destination address, source port and destination port
g. If IPv6
  i. If IP version number field !=6 then send to the host processor for software processing
  ii. If IP next header is not UDP (17) or UDP-Lite (136) then send to the host processor for software processing
  iii. If next header is UDP, and the checksum field is not 0, then send to the host processor for software processing
  iv. If next header is UDP-Lite
    1. If UDP checksum coverage field !=8 then send to the host processor for software processing
    2. Calculate UDP checksum according to RFC3828. Note: UDP checksum includes some fields from the IP header (called "pseudo-header")
    3. If UDP check mismatch then send to the host processor for software processing
  v. Initialize IPv6 flow key with protocol, source address, destination address, source port and destination port
h. Initiate flow descriptor lookup using CAPWAP/DTLS flow key type and IPv4 or IPv6 flow key. Buffer packet data while flow lookup proceeds
i. Receive flow lookup result
j. If flow descriptor not found then send to the host processor for software processing
II. Protocol Context Dependent ("Stateful") Processing
a. If Packet Encapsulation Format is Plain Text then send to the host processor for software processing
b. If Custom header indicated DTLS record offset
  i. Buffer packet until DTLS offset reached or end of packet
  ii. If end of packet reached before DTLS offset, then send to the host processor for software processing (DTLS record offset invalid)
c. else (don't skip to DTLS record offset)
  i. If Packet Encapsulation Format is CAPWAP/DTLS Header Present
    1. If CAPWAP/DTLS header version !=0 then send to the host processor for software processing
    2. If type !=1 (meaning no DTLS encapsulation) then send to the host processor for software processing
  d. If Packet Encapsulation Format is not one of CAPWAP/DTLS Header Present or DTLS alone, then send to the host processor for software processing (unrecognized packet encapsulation)
  e. If the DTLS record epoch field does not match the epoch in the flow descriptor then send to the host processor for software processing
  f. Validate that the DTLS sequence number is within expected range. FAP implements sliding window validation as per RFC4347 4.1.2.5 and RFC2401 Appendix C to protect against replay attacks (mandatory for DTLS)
    i. Verify sequence number. Note: Same as IPsec sequence number verification. If logic is needed, it can be provided
    ii. If the sequence number is disallowed, then send to the host processor for software processing
    Note: Before validating the DTLS record header, we must verify the DTLS MAC over the entire DTLS record
  g. Extract length from DTLS record. DTLS length indicates the number of payload bytes in the DTLS record, not including the DTLS record header. The length also includes the Initialization Vector (IV), MAC field, cipher padding and cipher padding length
  h. Receive DTLS header and DTLS record bytes into a buffer. If end of packet reached before DTLS length then send to the host processor for software processing (DTLS length invalid). Note that the receive-into-buffer process can proceed in parallel to the following step, feeding bytes to the security engine for decryption.
  i. Command security engine to decrypt the payload providing the following parameters. Note that the block encryption algorithm could be NULL. Note: Event if NULL, still run it through the security engine for debug purposes
    i. Block encryption algorithm (from flow descriptor and configuration lookup)
    ii. Encryption key length (from flow descriptor and configuration lookup)
    iii. Encryption key (from flow descriptor and configuration lookup)
    iv. Length of data. Encryption covers the first byte following the DTLS header and all the bytes of DTLS payload, including the trailer. Same length as in the DTLS header
    v. Data
  j. Receive decrypted data back from security engine. While the decrypted data arrives, the FAP can send it back through the security engine for the MAC check (next step). However, if the security engine requires the length in advance, then whole message decryption process must be completed first because the length for next step can be known only after the last byte is decrypted. The last byte contains the cipher pad length, which determines the length for the MAC calculation
  k. At this point, the receive packet buffer contains decrypted data any parsing exceptions in the remaining steps, which result in "send to the host processor for software processing" will deliver decrypted data, not the original encrypted packet.
  l. Verify cipher pad bytes. If the block cipher algorithm is NULL then no pad bytes should be present and the pad length field is 0. The pad length field is a one-byte field, the last byte of the decrypted message. Check that all pad bytes prior to the pad length field have the value equal to the number of pad bytes. If any pad byte value is wrong, send to the host processor for software processing m. Command the security engine to calculate MAC hash according to RFC2104, providing the following parameters. Note that the MAC hash algorithm could be NULL. If NULL, we still run it through the security engine for debug purposes. Also note that the DTLS MAC calculation includes the DTLS header, but with epoch and sequence number placed first
  i. MAC hash algorithm (from flow descriptor and configuration lookup)
  ii. MAC secret length (from flow descriptor and configuration lookup)
  iii. MAC secret (from flow descriptor)
  iv. Length of data. The MAC is calculated over the DTLS record header (13 bytes) plus DTLS record payload minus the MAC hash size minus pad length minus 1. Note: security engine might take the MAC field also to perform the MAC verification, in which case the MAC hash size should be included in the length
  v. Data. Note that the FAP needs to move the DTLS epoch and sequence number from the DTLS record to the first two fields prior to computing the MAC. This is according to RFC4347, section 4.1.2.1 and RFC4346, section 6.2.3.1
    1. DTLS epoch
    2. DTLS sequence Number
    3. DTLS type
    4. DTLS version
    5. Length (calculated above)
    6. DTLS record payload
n. Wait for MAC result and DTLS record buffering and MAC buffering
o. Verify MAC. Note: security engine may have compared the MAC and provided the result
p. If MAC did not match then send to the host processor for software processing
q. If sequence number was greater than the last verified sequence number, then we have a new greatest-verified-sequence number
  i. Store the sequence number in the flow descriptor as the last validated sequence number
  ii. Update the sequence window-check mask (move the window) in the flow descriptor. Note: Exact algorithm can be provided if necessary)
r. Else (sequence number was older than the last validated sequence number—accepted anyway because it is in the window)
  i. Mark the bit in the window-check mask in the flow descriptor according to the difference between the received sequence number and last validated sequence number. The exact algorithm for sequence number window validation can be provided if necessary
  ii. Increment statistic: DTLS old in-window sequence number accepted
s. If DTLS version !=configured value (e.g., 0xfeff) then send to the host processor for software processing
t. If Configuration enables Change Cipher Spec parsing and DTLS record type==ChangeCipherSpec (20) then
  i. If next byte following DTLS header==1 (Change Cipher Spec)
    [Note the 1-byte DTLS payload is encrypted]
      1. If the Pending Cipher Spec index==7, indicating no cipher spec is available for the flow descriptor, then send to the host processor for software processing with error
      2. Copy pending cipher spec in flow descriptor to current cipher spec and zero out current cipher spec
  ii. Note that a single packet may contain multiple DTLS records and the ChangeCipherSpec may not be the first or last DTLS record in the packet. It is valid (and required) to copy the pending cipher spec to the (new) current cipher spec because the new cipher spec is to be used on remaining DTLS records in the packet. A key use case is the "Finished" DTLS handshake message. See 7.4.9 of RFC4346.
  iii. Set result code to Change Cipher Spec executed
u. else
  i. Set result code to DTLS record found
III. Completion.
  a. Write result descriptor and packet through receive FIFO to DMA
  b. When last byte leaves FIFO, interrupt CPU if receive interrupt is enabled As described above, the FAP 104 may generate a result code to signify that a portion of the packet processing was successful or unsuccessful. In order to provide this result code to the host processor 102, the FAP 104 may link the result code with the received packet. The host processor 102 may use the result code in order to perform exception processing on the packet. The FAP 104 may create a link between the result code and the received packet through a results descriptor. The results descriptor may include: a processing result code (5 bits); a flow key (300 bits); and a flow key index to the flow descriptor in the flow descriptor table. Note that if the FAP 104 was unable to extract the flow key from the packet during early processing stages (e.g., processing stage 902, FIG. 9), it is possible that the flow key and flow key index may be undefined. The processing result code may indicate which step of the packet processing was unsuccessful. Examples of various processing result codes are listed in Table 3. In other implementations, the processing result codes may include other fields and bit lengths.

TABLE 3

Processing Result Codes

| Result Code | Processing Result |
|---|---|
| | "Stateless" Codes |
| 00001 | Ethertype not IPv4 or IPv6 |
| 00002 | IPv4 Header checksum failed |
| 00003 | IPv4 Invalid version |
| 00004 | IPv4 Packet fragment |
| 00005 | IPv4 Protocol field mismatch |
| 00006 | IPv4 Invalid header length |
| 00007 | IPv6 Invalid version |
| 00008 | IPv6 Next header mismatch |
| 00009 | UDP Checksum field != 0 |
| 00010 | UDP-Lite Checksum coverage field != 8 |
| 00011 | UDP-Lite Checksum failed |
| | "Stateful" Codes |
| 00013 | Flow descriptor not found |
| 00014 | Plain text packet |
| 00015 | Invalid DTLS offset in Custom header |
| 00016 | Unrecognized packet encapsulation format |
| 00017 | CAPWAP/DTLS header version mismatch |
| 00018 | CAPWAP without DTLS encapsulation |
| 00019 | DTLS sequence number disallowed |
| 00020 | DTLS epoch mismatch |
| 00021 | DTLS length invalid |
| 00022 | DTLS cipher pad check failed |
| 00023 | DTLS MAC check failed |
| 00024 | DTLS version mismatch |
| 00025 | No Pending Cipher Spec available |

TABLE 3-continued

Processing Result Codes

| Result Code | Processing Result |
| --- | --- |
| 00026 | DTLS ChangeCipherSpec executed |
| 00027 | DTLS Record Found |

Transmit Processing Path

In addition to processing receive packets, the wireless access point may process transmit packets. As discussed above, the host processor 102 may access, through the memory controller 110, a packet that has been stored in memory 112. If transmit processing on the packet is required, the host processor 102 may perform the transmit processing and then relay the packet to the wireless radio 116 for wirelessly transmitting the packet. As another example, the host processor 102 may partially process the packet and then relay the packet to the FAP 104. The FAP 104 may perform transmit processing on the packet and then relay the packet for wired transmission through the port 120 or for wireless transmission over the wireless radio 116.

For example, the host processor 102 may build a packet and deliver the packet, via memory 112, to the transmit buffer. The transmit buffer may be, as one example, a transmit FIFO buffer. The FAP 104 receives the packet from the transmit buffer and processes the packet by generating Ethernet, IP, UPD, and CAPWAP/DTLS headers, calculating the DTLS MAC, and encrypting the packet. The FAP 104 may also take a payload message that is larger than the maximum transmission unit (MTU) and fragment it into multiple CAPWAP messages. Note that it is advantageous to fragment at the CAPWAP layer and not the IP layer to enable traversal through more varieties of intermediate routers and NAPT gateways. The FAP 104 may allow a packet to bypass the normal transmit processing in the FAP 104 and relay the packet directly to the switch 118. Unlike when the FAP 104 processes a receive packet, the FAP 104 may not deliver a result code to the host processor 102 when the FAP 104 processes a transmit packet. Instead, as will be described in more detail below, the FAP 104 may compile flow acceleration processor statistics on whether the FAP 104 detected errors or dropped packets.

When the FAP 104 obtains a transmit packet from memory 112, the host processor 104 may have already appended instructions for how the FAP 104 should process the packet for transmission. The host processor 104 may append instructions using a transmit descriptor. As one example of a transmit descriptor, the transmit descriptor may be 114 bytes and may include the fields listed below in Table 4. In other implementations, different fields and bit lengths may be used.

TABLE 4

| Transmit Descriptor | | |
| --- | --- | --- |
| Field | Bits | Description |
| FAP Bypass | 1 | If set, the FAP is bypassed and the frame is transmitted directly to the switch. |
| Interrupt on transmit completion | 1 | If set, interrupt after all fragments of the packet have been sent to the switch |
| Packet payload size | 16 | Number of bytes in attached packet. Does not include DTLS or CAPWAP headers. For example, the number of bytes of "Wireless Payload" in FIG. 4. This packet payload size may be "fragmentable" into chunks up to Maximum CAPWAP Fragment Payload Size (below) |
| Maximum MTU size | 14 | Maximum MTU Size |
| Maximum CAPWAP Fragment Payload Size | 14 | The maximum number of bytes to use inside a CAPWAP fragment. Does not include CAPWAP header. Allows for encapsulating up to 16 KB |
| Number of CAPWAP fragments | 4 | The number of CAPWAP fragments calculated by the host processor. Note that some receiver systems support a limited number of fragments per packet. For instance, the receiver may support only 2 fragments per packet. |
| Header usage | 8 | These bits describe which if any optional headers are present. 1 directs the FAP to include the header and 0 directs the FAP to omit the header. The FAP may insert the basic Ethernet header and UDP/UDP-Lite header:<br>32-bit Custom header<br>64-bit Custom header<br>Outer 802.1q tag<br>Inner 802.1q tag<br>CAPWAP DTLS header<br>DTLS Record header<br>CAPWAP header<br>CAPWAP header options |
| IPv6 | 1 | If set, FAP will insert IPv6 header (40 bytes), otherwise, IPv4 (20 bytes) and calculate the IP header checksum. |
| UDP-Lite | 1 | If set, FAP will insert the UDP-Lite header and calculate the checksum. |

TABLE 4-continued

Transmit Descriptor

| Field | Bits | Description |
|---|---|---|
| CAPWAP header length | 5 | Describes the CAPWAP header length as being from 8 to 19 bytes. |
| Header data | | Following fields are templates for headers that the FAP may copy into the outgoing packet:<br>Custom header. 64 bits<br>Ethernet Destination Address. 48 bits<br>Ethernet Source Address. 48 bits<br>Outer 802.1q tag. 32 bits<br>Inner 802.1q tag. 32 bits<br>Ethertype. 16 bits<br>IPv6 or IPv4 header. 40 bytes<br>UDP or UDP-Lite header. 8 bytes<br>CAPWAP DTLS header. 4 bytes<br>DTLS Record Header. 13 bytes<br>Includes initial sequence number<br>CAPWAP Header. 8 bytes<br>CAPWAP Header options. 11 bytes |
| Block encryption algorithm | 3 | Selects from one of 7 entries in a configuration table (see Table 5 below). CAPWAP defines American Encryption Standards (AES), AES-128 and AES-256, but algorithm other alternatives may be used |
| MAC hash algorithm | 3 | Selects from one of 7 entries in a configuration table (see Table 5 below). CAPWAP/DTLS defines secure hash algorithm SHA-1, but other algorithm alternatives may be used |
| MAC secret | 256 | Used to generate the MAC of a DTLS record. This is either the client_write_MAC_secret or server_write_MAC_secret, depending on the TLS role (server or client). Software generates the MAC secret and may utilize the security coprocessor to do so. Note the MAC secret is assigned by the transmitting entity, not the receiving entity |
| Encryption key | 256 | Used to encrypt a DTLS record. This is either client_write_key or server_write_key, depending on the TLS role (server or client). 256 bits, supporting AES-256. Software generates the encryption key and may utilize the security coprocessor to do so. |

The flow descriptor may include information indicating the security configuration. The configuration may be selected by setting the configuration fields. The configuration fields may include the fields listed in Table 5: In other implementations, different configuration fields and bit lengths may be used.

TABLE 5

Configuration Fields

| CAPWAP/DTLS enabled | If disabled, then the receive processing is bypassed, and receive data is delivered to memory via the receive FIFO as a regular Ethernet packet, but with the optional Custom header attached |
|---|---|
| Ethernet Medium Access Control addresses with masks | Only one address is required, but the FAP may implement more. It may be useful to provide a classless interdomain routing-like (CIDR-like) mask with each address to allow for matching a block of addresses |
| DTLS version supported | DTLS version major number and minor number |
| Hash algorithm selector configuration | This selector configuration allows for extendable and reconfigurable meaning of the flow descriptor. The security engine supports more algorithms. The configuration identifies algorithms that can be selected on a per-packet basis. Default mappings follow, but more mappings could be supported by the security engine. |

TABLE 5-continued

Configuration Fields

Null. 0 bit hash size and 0 bit key length
SHA-1. 160 bit hash size and 160 bit key length
SHA-256. 256 bit hash size and 256 bit key length
-(7): Null Prior to transmission of a packet, the host processor 102 may supply the MTU size and maximum CAPWAP fragment payload size for the packet. The MTU size consists of packet fields to be transmitted on the wire, starting with the first byte of the Ethernet Medium Access Control Destination Address, and ending with the last byte of DTLS trailer (DTLS pad length byte), and does not include Ethernet FCS. Also included in the MTU is the optional Custom header, even though it is not transmitted on the wire. The CAPWAP fragment payload size is the length of payload data after the CAPWAP header and before the optional DTLS MAC. For example, referring to FIG. 4, the length of "Wireless Payload" 414 is a valid CAPWAP fragment payload size.

The host processor 102 may determine the MTU size from provisioning data or performing Path MTU discovery, as described in RFC5415. The host processor 102 may also calculate the maximum CAPWAP fragment payload size, rather than offloading this calculation to the FAP 104. The maximum fragment size can vary from frame to frame, depending on the packet encapsulation format selected by the host processor 102. For instance, the CAPWAP DTLS header and DTLS Record Header may not always be present. In one implementation, the maximum CAPWAP fragment payload size may be calculated as the MTU size minus header and padding overhead. The CAPWAP fragment payload size may include the parameters listed in Table 6. In other implementations, different parameters and parameter lengths may be used.

TABLE 6

CAPWAP Fragment Payload Size

| Parameters | Parameter Length |
|---|---|
| Custom header | If used, 4 bytes |
| Ethernet header | Includes possible double-tag and LLC/SNAP, if used. 14 to 22 bytes |
| IPv4 or IPv6 header | 20 or 40 bytes |
| UDP or UDP-Lite | 8 bytes |
| Optional CAPWAP DTLS Header | 0 or 4 bytes |
| Optional DTLS Record Header | 0 or 13 bytes |
| CAPWAP Header | 8 bytes |
| Optional DTLS Initialization Vector | Cryptic Block Cipher (CBC) block size (16 bytes for AES-128 and AES-256) |
| Optional DTLS MAC | 20 bytes for SHA-1 and 32 bytes for SHA-256 |
| DTLS cipher padding | 1 plus N, where N is calculated as (MTU minus number of overhead bytes above (including 1 byte cipher pad length)) modulo CBC block size |

As one example of maximum CAPWAP fragment payload size, assume a 1518 MTU size with 14 byte Ethernet header, 20 byte IPv4 header, and optional DTLS using American Encryption Standards (AES) AES-256 and secure hash algorithm SHA-256 yields 116 byte of unpadded overhead and 1518−116=1402 bytes of payload. The number of pad bytes necessary (not including the last cipher pad length byte) is 1402 mod 16=10. Thus, the maximum CAPWAP fragment payload size in this example is 1518−116−10=1392. In this example, the headers and padding overhead is 126 bytes. The host processor 102 may calculate the number of fragments to generate for each transmit packet in order to keep track of the DTLS sequence number. The FAP 104 transmit processing may not return a transmit result or "last sequence number used."

Figure 10:
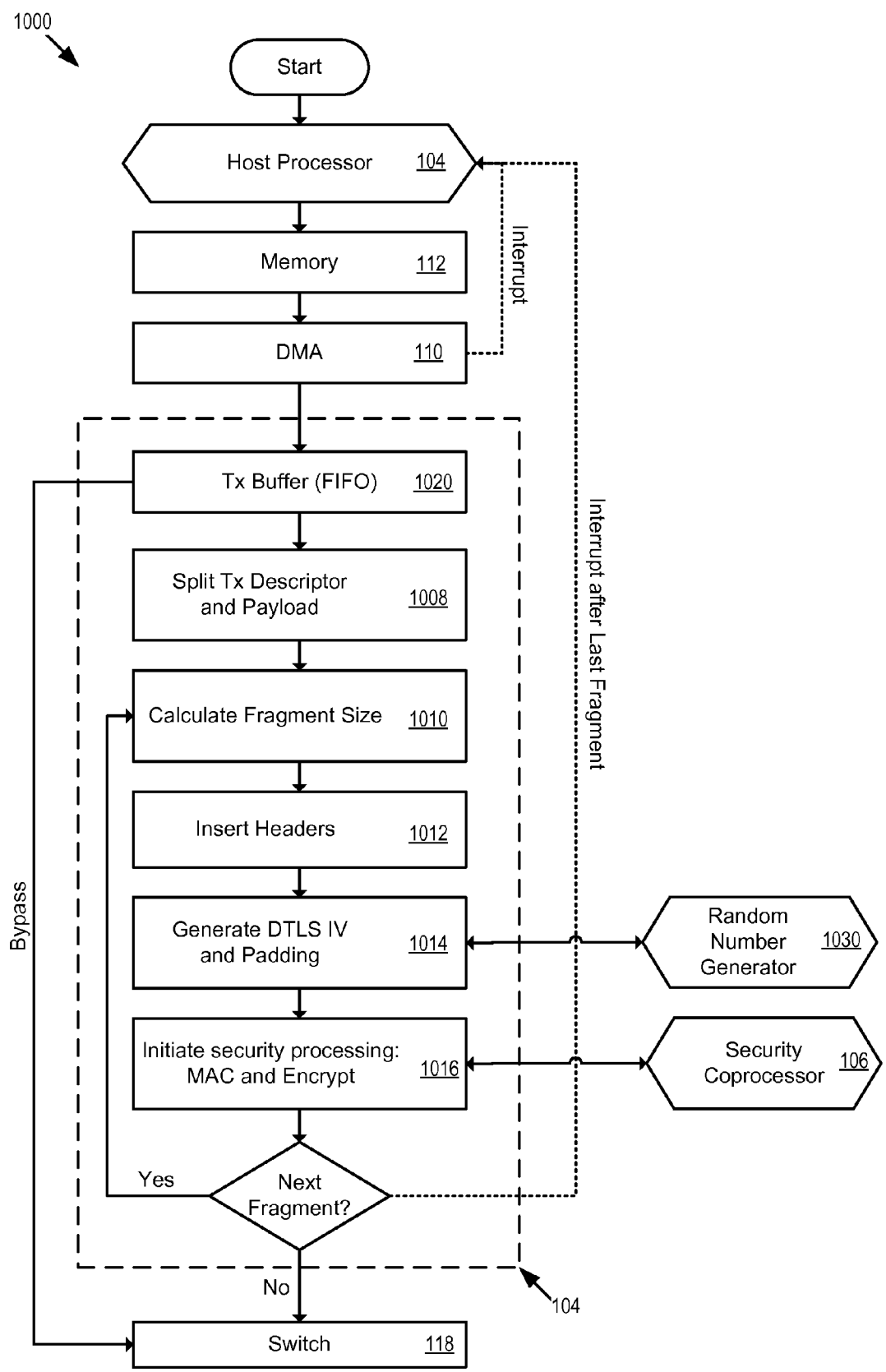
FIG. 10 is an example of a flow diagram for transmit processing that uses a flow acceleration processor.

Referring now to FIG. 10, it shows an example flow diagram 1000 of processing stages that the FAP 104 may use when transmit processing a packet. The FAP 104 may obtain a transmit packet from the host processor 102, via memory 112 using DMA 110. The FAP 104 may buffer the packet in a transmit buffer 1020.

If transmit processing of the packet is not necessary or desired, the FAP 104 may direct the packet from transmit buffer 1020 to the switch 118 and bypass additional transmit processing on the packet by the FAP 104. If transmit processing of the packet is necessary or desired, the FAP 104 may split the transmit descriptor from the packet payload (1008). Next, the FAP 104 may calculate the fragment size according to the information contained in the transmit descriptor (1010) and fragment the payload into fragmented portions. Next, the FAP 104 may insert the headers for the fragmented portion of the packet (1012). After the headers have been inserted for the fragmented portion of the packet, if a DTLS record header has been inserted, the FAP 104 may generate a DTLS Initialization Vector (IV) and pads the initialization vector (1014) using the random number generator 1030. The FAP 104 may then initiate security processing (1016) using the security coprocessor 106 to encrypt the fragmented packet portion and apply the message authentication code.

The FAP 104 may determine if the packet payload has a next fragmented portion for processing. If not, the packet portions are assembled and delivered to the switch 118. If the packet payload has an additional portion for processing, the FAP 104 may return to block 1010 to calculate the next fragmented portion of the packet payload. The FAP 104 may continue to processes the fragmented portions until the packet payload has been processed and delivered to the switch 118.

Flow diagram 1000 may be implemented, as one example, using the following algorithm. In other implementations, packet formulating, packet buffering, initializations, header insertions, bit lengths, skipped headers, supported header types, fragmentation, security checking, and processing sequences may differ from those listed below.

1. The host processor uses formulates a packet in memory, along with a transmit descriptor. It prepares the DMA engine to transfer them into the FAP transmit FIFO. The packet may contain only CAPWAP payload and not headers (no Ethernet, IP, UDP, CAPWAP or DTLS headers).
2. Split the transmit descriptor from the packet payload
3. Buffer the transmit descriptor for local read-write access
4. Prepare an outgoing MTU size packet buffer (potentially for a fragment of the original packet)
   a. The FAP may employ an accumulator to keep track of the size of the data it inserts into the packet buffer. It uses the packet buffer to determine how much data, for the fragmentation process, to send to the switch, and will detect an error if the size exceeds the MTU is exceeded
   b. Copy Packet Payload Size to Remaining Payload Size. FAP will reduce the Remaining Payload Size for each fragment transmitted
   c. If Number of CAPWAP Fragments >0 then set a fragmentation-enabled flag for this packet
   d. Initialize Fragment ID to 0 and Fragment Offset to 0
   e. The FAP might keep track of where certain header fields are in the packet buffer. After building a header template in the packet buffer for each packet, the FAP may write header fields that are lengths, fragment identification data, and sequence numbers. The following are the packet fields that may need to be updated:
      i. Length fields
         1. IPv4.total length
         2. IPv6 header.payload length
         3. UDP length
         4. DTLS Record.length
      ii. Fragment information
         1. CAPWAP.F
         2. CAPWAP.Fragment ID
         3. CAPWAP.Fragment Offset
      iii. Sequence numbers
         1. IPv4.ID
         2. DTLS Record.sequence number
      iv. UDP-Lite checksum
      v. IPv4 Header checksum
5. If the Custom header is used, select configured 32- or 64-format, and insert into outgoing packet buffer. The switch processes and strips this before transmitting.
6. Insert Ethernet DST and SRC addresses
7. If the outer 802.1q header is used, insert.

8. If the inner 802.1q header is used, insert.
9. Insert the Ethertype.
10. If IPv6 then
    a. Insert the IPv6 header
    b. Remember where the payload length field is located
   Else
    c. Insert the IPv4 header
    d. Remember where the total length field is located
    e. Remember where the ID field is located
    f. Remember where the header checksum field is located
11. Insert the UDP/UDP-Lite header
12. If UDP-Lite is used
    a. Remember where the Checksum is located
   Else
    b. Remember where the Length is located
13. If CAPWAP DTLS Header is used, insert
14. If DTLS Record Header is used, insert
    a. Remember where sequence number is located
    b. Remember where length is located
15. If CAPWAP Header is used, insert the number of bytes indicated in the flow descriptor
    a. Remember where fragmentation fields are located
16. If DTLS Record Header is used then insert CBC block size bytes
17. Insert MIN(Remaining Payload Size, Maximum Fragment Size) bytes from packet payload (to be encrypted)
    a. Reduce Remaining Payload size by the number of bytes inserted
    b. If fragmentation is not enabled and remaining payload size >0 then this is an error. Abort the packet and increment statistic
18. If DTLS Record Header is used then calculate number of CBC overhead bytes and insert padding bytes and the pad-length field. Each pad byte has the value of the number of padding bytes. If the number of padding bytes is zero, no pad bytes are inserted
    a. Overhead is CBC block size plus the MAC hash size plus CBC padding overhead. The CBC block size (for the initialization vector) is determined by looking up configuration, given the CBC algorithm index in the transmit descriptor. The MAC hash size is determined the same way. The CBC padding overhead is the number of bytes to pad out the encrypted data (packet payload size plus MAC hash size plus CBC padding plus 1) to an integral number of CBC blocks. The '1' extra byte is the pad length field. Thus the overhead is:
        i. X=CBC block size−((MIN(remaining payload size, maximum fragment size)+MAC hash size+1) modulo CBC block size)
        ii. If (X==16) then overhead is 0 otherwise overhead is X
    b. Insert the pad length field, which has the value equal to the number of pad bytes. Note: 0 is valid
19. If the accumulated number of bytes in the packet (possibly a fragment) exceed the MTU then this is an error
    a. Abort the packet and all remaining fragments
    b. Increment MTU-exceeded statistic
20. If IPv4 is used
    a. Set IPv4.Total Length to the number of bytes in the IPv4 header through optional padding length
    b. Calculate the IPv4 header checksum and store in the packet
21. If IPv6 is used, set IPv6.Payload Length to the number of bytes in the header through optional padding length (does not include IPv6 header)
22. If UDP-Lite not used (UDP is used), set Length to the number of bytes in the UDP header through optional padding length
23. If UDP-Lite is used, calculate the checksum, which includes selected fields from the IPv6 header
24. Set DTLS Record Header Length to the number of bytes following the DTLS record header, through the optional padding length
25. If CAPWAP header is used then set up fragment information
    a. If fragmentation enabled for this packet
        i. Set CAPWAP.F=1
        ii. Set CAPWAP.Fragment ID=current Fragment ID
        iii. Set CAPWAP.Fragment Offset=current Fragment Offset
    b. else
        i. Set CAPWAP.F, Fragment ID, Fragment Offset to 0
26. If DTLS Record Header used then generate the IV, calculate MAC and encrypt
    a. Command the random number generate to calculate a random number of the size of a cipher block and insert into the IV field
    b. Command security engine to calculate MAC according the MAC hash algorithm. Starting from the first byte of the DTLS header through the last byte of payload (not including the empty MAC field, CBC pad and padding length). Use the MAC secret from the transmit decriptor
    c. Write the MAC results, length according MAC hash algorithm, into the packet buffer MAC field
    d. Command security engine to encrypt data according the CBC algorithm indicated in the flow descriptor, and the encryption key. Encrypt data starting with the first byte following the DLTS Record Header, through the padding length field
    e. Receive encrypted data from the security engine and write into the packet buffer
27. Forward packet buffer to the switch
28. If Remaining Payload Size !=0 then prepare next fragment (like step 4 above)
    a. Reset the packet data accumulator counter
    b. Increment Fragment ID by 1
    c. Add the number of CAWAP payload bytes sent to the Fragment Offset
    d. Reset the internal registers that locate length fields, sequence numbers and checksums
    e. Go to step 5
29. Issue transmit complete interrupt Command Processing Path In addition to receive processing and transmit processing, the FAP 104 may support command processing. A command processing path may be used to update the flow descriptor lookup table (926, FIG. 9) or for performing optional receive processing on a packet. For example, if the FAP 104 does not perform certain receive processing, the host processor 102 may perform additional processing steps after the FAP 104 delivers the packet to memory 112. When the host processor 102 receives the packet and result code, the host processor 102 may perform exception processing to process the packet at the host processor 102. The command processing path allows the FAP 104 to re-process the packet after the host processor 102 has performed exception processing. Once the exception processing has been performed by the host processor 102, the host processor 102 may return the packet, via memory 112, to the FAP 104 for further receive processing.

For example, as described above, when the FAP 104 determines that the packet encapsulation format does not meet a recognition criteria, the FAP 104 may generate a result code for the packet and return the packet to memory 112. The host processor 102 may retrieve the packet from memory 112 to perform exception processing that may adjust the packet encapsulation format so that the FAP 104 may recognize the adjusted packet encapsulation format. Then, the host processor 102 may return the packet to memory 112 so that, as part of the command processing path, the FAP 104 may continue processing the packet.

In another example, the command processing allows the host processor 102 to reassemble fragmented packets, and deliver the reassembled packet, via to memory 112, to the FAP 104 for further receive processing on the reassembled packet. The command processing path allows the packet to move back and forth between the host processor 102 and the FAP 104 to allow either the host processor 102 or the FAP 104 to perform the desired processing on the packet.

Command processing may use a command descriptor associated with a packet to specify the command processing instructions for the packet. The command descriptor may have a set of command processing fields. For example, the command descriptor may have the format listed in Table 7.

TABLE 7

Command Descriptor

| Field | Bits | Description |
|---|---|---|
| Command | 4 | Indicates the instruction for the packet: |
| | | (0) FIFO Sync. Used to confirm that the transmit FIFO is empty. This can be used for debugging or diagnostics. |
| | | (1) Tx Sync. Used to confirm that the transmit data path is empty. This can be used to confirm that the transmit path is quiet. |
| | | (2) Add Flow. Used to add a new flow descriptor in the flow descriptor lookup table. |
| | | (3) Delete Flow. Used to remove a flow descriptor from the flow descriptor lookup table. |
| | | (4) Receive Packet. Used to deliver a packet for receive processing. A receive packet, with optional Custom header, may immediately follow the command descriptor |
| | | (5) Change Cipher Spec. Used as a "back door" for cases where Change Cipher Spec parsing in the receive processing path is not functioning. This may be used for testing. The host processor may provide an initial value for the pending cipher spec of an existing flow descriptor. |
| | | (6)-(15) Reserved. |
| Parameters | | Identifier. (32 bits). The host processor may use this field for transferring instructions to and from the FAP. |
| | | Interrupt on Completion. (1 bit). If set, the receive FIFO delivers an interrupt to the host processor when all result descriptor bytes have left the buffer |
| | | Flow key. (108 bits or 300 bits). The flow key, as described above, may be 108 bits and include the following fields: |
| | | flow key type (3 bits) |
| | | IP type (1 bit) |
| | | IPv4 (72 bits) |
| | | source port (16 bits) |
| | | destination port (16 bits) |
| | | In another example, the flow key may be 300 bits and include the following fields: |
| | | flow key type (3 bits) |
| | | IP type (1 bit) |
| | | IPv6 (264 bits) |
| | | source port (16 bits) |
| | | destination port (16 bits) |

Command processing may use a command result descriptor for providing results of whether the command processing was successful. The command result descriptor may have a set of command result descriptor fields. For example, the command descriptor may have the format listed in Table 8.

TABLE 8

Command Results Descriptor

| Field | Bits | Description |
|---|---|---|
| Identification | 32 | The host processor may use this field for transferring instructions to and from the FAP. The field corresponds to the "identification" command descriptor field in Table 7. |
| Error Code | 8 | Contains the type of error, if any, encountered during command processing:<br>(0) No error.<br>(1) Flow key not found (Delete Flow, Change Cipher Spec)<br>(2) Flow table full (Add Flow) |

Figure 11:
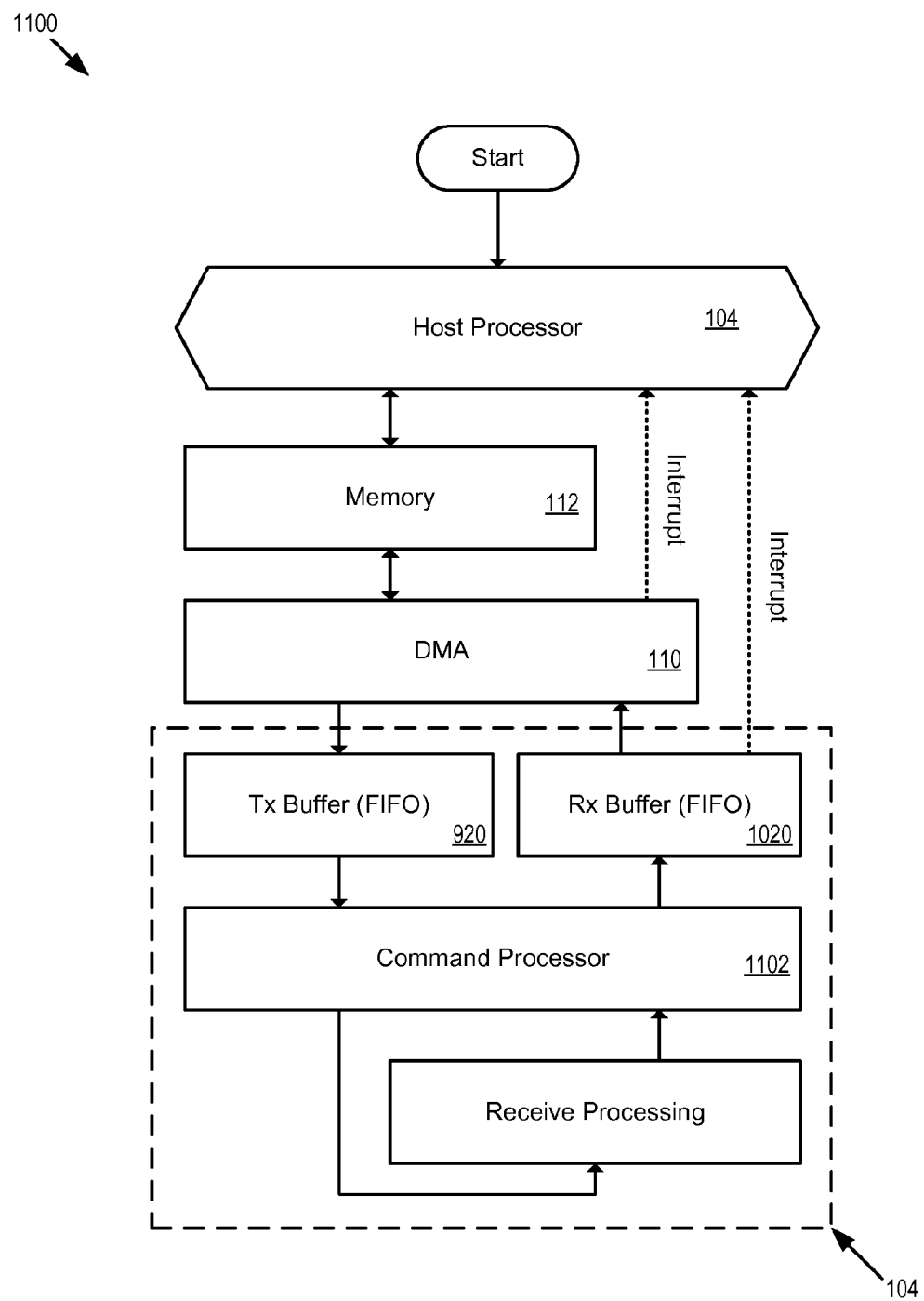
FIG. 11 is an example of a flow diagram for command processing that uses a flow acceleration processor.

FIG. 11 shows an example of command processing flow diagram 1100 showing the command processing path. The FAP 104 may obtain a command processing packet from the host processor 102, via memory 112 using DMA 110. The FAP 104 may processes the packet at the command processor 1102 by performing the instructions contained in the command descriptor. Depending on the instruction received, the command processor 1102 may perform various processing to carry out the instructions. The command processor may perform processing commands that include, as examples, sending synchronization commands that synchronize the in-progress packet transmit state and state of transmit and receive buffers with the state of host processing, add a new flow descriptor to the flow descriptor lookup table 926 (FIG. 9), remove a flow descriptor from the flow descriptor lookup table 926 (FIG. 9), enable receive processing, disable receive processing, supply an updated Change Cipher Spec for security processing, or deliver a receive packet that may immediately follow the command descriptor. As part of the synchronization commands implemented by the command processor 1102, the command processor 1102 may synchronize the transmit buffer state of the FAP 104 with the host processing state of the host processor 102 by checking the transmit buffer 920 to confirm that the transmit data path is empty and by checking the receive buffer 1020 to confirm that the receive data path is empty. In addition to performing processing commands, the command processing path may be used for testing and debugging purposes.

Security Processing

Security processing may be performed by the host processor 102, the FAP 104, or the security coprocessor 106. Security processing may involve various security algorithms. In order for the processor to be able to identify the security algorithm to use for processing, the security algorithm may have a security algorithm type.

For example, in one implementation, three algorithm types may contribute to DTLS security processing: Sign, Block Cipher Encryption, and Public Key Encryption. Sign algorithm type is used to generate a signature on a block of data so that the recipient can trust that the block of data was unaltered since the sending entity signed it. Block cipher encryption algorithm type uses a key to encrypt a sequence of data blocks, with each block the same size. Public key encryption algorithm type allows a receiver to decrypt a message from a transmitter by knowing only part (the public or private part) of the key. Public key encryption algorithm type usually employs certificates that identify the transmitter, and can be verified by a chain of trust from a root certificate. Each processor may support some, all, or none of the security algorithms.

In addition, the algorithm types may be tied together to form a cipher suite. The cipher suite may include a standard set of cipher identifiers, such as those defined by the DTLS and TLS standards. For example, TLS defines a standard set of cipher suite identifiers, where the cipher suite identifiers include a concatenation of named algorithms. For authenticating a DTLS end point, the cipher suite may include: (1) key change algorithm; (2) bulk encryption algorithm; and (3) message authentication algorithm. For CAPWAP, the cipher suites listed in Table 9 may be supported.

TABLE 9

TLS Cipher Suites

TLS_RSA_WITH_AES_128_CBS_SHA
TLS_DHE_RSA_WITH_AES_128_CBC_SHA
TLS_RSA_WITH_AES_256_CBC_SHA
TLS_DHE_RSA_WITH_AES_256_CBC_SHA
TLS_PSK_WITH_AES_128_CBC_SHA
TLS_DHE_PSK_WITH_AES_128_CBC_SHA
TLS_PSK_WITH_AES_256_CBC_SHA

Security processing may utilize exchange key algorithms. TLS defines a number of possible key exchange algorithms and CAPWAP may use a subset of these key exchange algorithms. The key changes algorithms listed in Table 10 may be used in security processing.

TABLE 10

TLS Key Exchange Algorithms

Ephemeral Diffie Hellman (DHE) with RSA signatures
Diffie Hellman with RSA-based certificates
RSA
Null key exchange
Ephemeral Diffie Hellman with DSS signatures
Anonymous Diffie Hellman with no signatures
Diffie Hellman with DSS-based certificates As described above, the FAP 104 may maintain statistical information related to the packet processing that the FAP 104 performs. The statistical information may be used for debugging and troubleshooting purposes. Table 11 shows examples of the type of statistical information that the FAP 104 may record.

TABLE 11

Statistical Information

| Receiving | Total number of packets received from switch. |
|---|---|
| Processing | Destination medium access control address mismatch<br>Ethertype not IPv4 or IPv6<br>IPv4 Header checksum failed<br>IPv4 Invalid version<br>IPv4 Packet fragment<br>IPv4 Protocol field mismatch<br>IPv4 Invalid header length<br>IPv6 Invalid version<br>IPv6 Next header mismatch<br>UDP checksum != 0<br>UDP-Lite coverage != 8<br>UDP-Lite checksum failed<br>Flow descriptor not found.<br>Plain text packet.<br>Invalid DTLS offset in BRCM header<br>Unrecognized Packet Encapsulation. |

TABLE 11-continued

Statistical Information

|  | |
|---|---|
|  | CAPWAP/DTLS header version mismatch |
|  | CAPWAP without DTLS encapsulation. |
|  | DTLS sequence number disallowed. |
|  | DTLS epoch mismatch. |
|  | DTLS length invalid |
|  | DTLS cipher pad check failed |
|  | DTLS MAC check failed. |
|  | DTLS version mismatch |
|  | DTLS old in-window sequence number accepted. |
|  | No Pending Cipher Spec available |
|  | DTLS ChangeCipherSpec executed |
|  | DTLS ContentType other than ChangeCipherSpec. |
|  | Receive FIFO overrun |
|  | Interrupt delivered. |
| Transmit Processing | Number of (fragmentable) packet transmissions initiated by software. |
|  | Number of CAPWAP fragments generated. |
|  | Fragmentation-needed error. The packet should be fragmented, but fragmentation was not enabled |
|  | MTU exceeded error. The packet or fragment generated exceeds the MTU |
| Command Processing | Number of commands initiated by software. |
|  | Number of command packets looped back to receive processing. |
|  | Number of flow not found errors |
|  | Number of flow table full errors |

The methods, devices, and logic described above may be implemented in many different ways in many different combinations of hardware, software or both hardware and software. For example, all or parts of the system may include circuitry in a controller, a microprocessor, or an application specific integrated circuit (ASIC), or may be implemented with discrete logic or components, or a combination of other types of analog or digital circuitry, combined on a single integrated circuit or distributed among multiple integrated circuits. All or part of the logic described above may be implemented as instructions for execution by a processor, controller, or other processing device and may be stored in a tangible or non-transitory machine-readable or computer-readable medium such as flash memory, random access memory (RAM) or read only memory (ROM), erasable programmable read only memory (EPROM) or other machine-readable medium such as a compact disc read only memory (CDROM), or magnetic or optical disk. Thus, a product, such as a computer program product, may include a storage medium and computer readable instructions stored on the medium, which when executed in an endpoint, computer system, or other device, cause the device to perform operations according to any of the description above.

The processing capability of the system may be distributed among multiple system components, such as among multiple processors and memories, optionally including multiple distributed processing systems. Parameters, databases, and other data structures may be separately stored and managed, may be incorporated into a single memory or database, may be logically and physically organized in many different ways, and may implemented in many ways, including data structures such as linked lists, hash tables, or implicit storage mechanisms. Programs may be parts (e.g., subroutines) of a single program, separate programs, distributed across several memories and processors, or implemented in many different ways, such as in a library, such as a shared library (e.g., a dynamic link library (DLL)). The DLL, for example, may store code that performs any of the system processing described above. While various embodiments of the invention have been described, it will be apparent to those of ordinary skill in the art that many more embodiments and implementations are possible within the scope of the invention. Accordingly, the invention is not to be restricted except in light of the attached claims and their equivalents.

What is claimed is:

1. A method comprising:
receiving a packet at a communication interface, the packet comprising a packet header and a packet payload;
providing the packet to a flow acceleration processor prior to providing the packet to a host processor;
at the flow acceleration processor:
when the packet header, packet payload, or both fail to meet a recognition criteria, determining to cause exemption processing for the packet, the exemption processing comprising re-assigning a processing task from the flow acceleration processor to the host processor;
responsive to the determination, assigning a processing result code to the packet, the result code configured to indicate exception processing for the packet; and
providing the processing result code and the packet to the host processor; and
at the host processor:
receiving the result code; and
executing an exception handler on the packet in response to receiving the result code, the exception handler configured to execute the processing task that was reassigned from the flow acceleration processor to the host processor.

2. The method of claim 1, where the recognition criteria comprises passing a header check.

3. The method of 2, where passing the header check comprises validating a security header sequence number of the packet header.

4. The method of claim 1, where the recognition criteria comprises locating a flow key extracted from the packet header in a flow lookup table.

5. The method of claim 1, where the recognition criteria comprises successfully decrypting the packet payload.

6. The method of claim 1, where analyzing the packet comprises communicating the packet payload to a security coprocessor for security processing.

7. A system comprising:
a communication interface configured to receive a packet, the packet comprising a packet header and a packet payload;
a flow acceleration processor in communication with the communications interface that receive the packet prior to providing the packet to a host processor;
the flow acceleration processor configured to:
when the packet header, packet payload, or both fail to meet a recognition criteria, determine to cause exemption processing for the packet, the exemption processing comprising a re-assignment of a processing task from the flow acceleration processor to the host processor;
responsive to the determination, assign a processing result code to the packet, the result code configured to indicate exception processing for the packet; and
provide the processing result code and the data packet to the host processor; and
the host processor configured to:
receive the result code; and
execute an exception handler on the packet in response to receiving the result code, the exception handler configured to execute the processing task that was reassigned from the flow acceleration processor to the host processor.

8. The system of claim 7, where the recognition criteria is met when the packet passes a header check.

9. The method of 8, where the packet passes the header check by validating a security header sequence number of the packet header.

10. The system of claim 7, where the recognition criteria is met when a flow key extracted from the packet header is located in a flow lookup table.

11. The system of claim 7, where the recognition criteria is met when the packet payload is successfully decrypted.

12. The system of claim 7, further configured to analyze the packet by communicating the packet payload to a security coprocessor for security processing.

13. A method comprising:
 receiving a packet at a communications interface, the packet comprising a header portion and a payload portion;
 determining to offload the packet to a flow acceleration processor instead of initially processing the packet at a host processor;
 at the flow acceleration processor:
  determining a packet encapsulation format of the packet;
  when the flow acceleration processor recognizes the packet encapsulation format of the packet, initially processing the packet at the flow acceleration processor; and
  when the flow acceleration processor does not recognize the packet encapsulation format of the packet, providing the packet to the host processor with a result code, the first result code configured to indicate that the flow acceleration processor did not recognize the packet encapsulation format of the packet; and
 at the host processor:
  in response to the first result code, modifying the packet encapsulation format of the packet to an updated packet encapsulation format; and
  resubmitting the packet with the updated packet encapsulation format to the flow acceleration processor.

14. The method of claim 13, further comprising:
 when flow acceleration processor processes the packet, determining from the header portion that the payload portion comprises security;
 offloading the packet to a security coprocessor for security processing; and
 receiving at the flow acceleration processor a security processed payload portion from the security coprocessor.

15. The method of 14 where security processing comprises decryption processing of the payload portion and where the security processed payload portion comprises a decrypted payload.

16. The method of claim 13, further comprising, when the packet is processed at the flow acceleration processor,
 determining a header type for the header portion of the packet;
 analyzing the header type;
 if the flow acceleration processor recognizes the header type, processing the packet at the flow acceleration processor; and
 if the flow acceleration processor does not recognize the header type, providing the packet to the host processor with a result code.

17. The method of claim 13, where recognizing the packet encapsulation format comprises locating in a flow lookup table a flow key extracted from the header portion.

18. The method of claim 13 further comprising:
 synchronizing a buffer state of the flow acceleration processor with a host processing state of the host processor.

19. The method of claim 1, wherein further comprising synchronizing a buffer state of the flow acceleration processor with a host processing state of the host processor.

20. The system of claim 7, wherein the flow acceleration processor further configured to:
 determine a header type for the packet header; and
 if the flow acceleration processor does not recognize the header type, provide the packet to the host processor with another result code.

* * * * *